US012589482B2

(12) United States Patent
Smith et al.

(10) Patent No.: US 12,589,482 B2
(45) Date of Patent: Mar. 31, 2026

(54) WALK-ABOUT EXOSKELETON

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 18/408,413

(22) Filed: Jan. 9, 2024

(65) Prior Publication Data

US 2024/0227162 A1 Jul. 11, 2024

Related U.S. Application Data

(60) Provisional application No. 63/437,989, filed on Jan. 9, 2023.

(51) Int. Cl.
B25J 9/00 (2006.01)

(52) U.S. Cl.
CPC ..... B25J 9/0006 (2013.01); *A61H 2201/1619* (2013.01); *A61H 2201/164* (2013.01); *A61H 2205/06* (2013.01)

(58) Field of Classification Search
CPC .. B25J 9/0006; A61H 3/00; A61H 2201/1619; A61H 2201/164; A61H 2205/06
See application file for complete search history.

(56) References Cited

U.S. PATENT DOCUMENTS

| 6,343,802 | B1 * | 2/2002 | Workman | .............. A61H 3/008 |
| | | | | 482/68 |
| 6,899,660 | B1 | 5/2005 | Chin et al. | |
| 7,458,588 | B2 | 12/2008 | Kallevig | |
| 7,544,172 | B2 * | 6/2009 | Santos-Munne | ..... A61H 1/0292 |
| | | | | 601/5 |
| 8,942,846 | B2 * | 1/2015 | Jacobsen | ............... B25J 9/0084 |
| | | | | 700/262 |

(Continued)

FOREIGN PATENT DOCUMENTS

| DE | 202017107072 U1 | 12/2017 |
| DE | 102017008258 A1 | 3/2019 |

(Continued)

OTHER PUBLICATIONS

International Search Report for International Application No. PCT/US2024/010949 dated Apr. 18, 2024, 11 pages.

(Continued)

*Primary Examiner* — Timothy A Stanis
(74) *Attorney, Agent, or Firm* — Thorpe North & Western, LLP

(57) ABSTRACT

A walk-about exoskeleton system can comprise an exoskeleton and a walk-about platform in support of the exoskeleton. The walk-about platform can be maneuverable about a ground surface. The walk-about platform can comprise a conveyance system operable with the walk-about platform. The conveyance system can be operable to facilitate movement of the walk-about platform about the ground surface. The walk-about platform can also comprise a bi-pedal locomotion zone defined, at least in part, by the walk-about platform. The bi-pedal locomotion zone can provide clearance for bi-pedal locomotion of an operator donning the exoskeleton.

30 Claims, 18 Drawing Sheets

(56)                    References Cited

U.S. PATENT DOCUMENTS

| | | | |
|---|---|---|---|
| 9,744,095 B1 | 8/2017 | Mazzei et al. | |
| 9,789,023 B1 | 10/2017 | Lee et al. | |
| 10,166,165 B1 | 1/2019 | McGuire | |
| 10,543,145 B1 | 1/2020 | McGuire | |
| 11,738,446 B2 * | 8/2023 | Smith | B25J 3/04 |
| | | | 414/6 |
| 12,036,158 B2 | 7/2024 | Ang et al. | |
| 2003/0084653 A1 | 5/2003 | Velke et al. | |
| 2006/0012146 A1 | 1/2006 | Farnella et al. | |
| 2009/0236826 A1 | 9/2009 | Queen | |
| 2009/0298653 A1 * | 12/2009 | Rodetsky | A61H 1/0266 |
| | | | 280/200 |
| 2010/0270771 A1 * | 10/2010 | Kobayashi | A61H 3/04 |
| | | | 280/210 |
| 2012/0172770 A1 | 7/2012 | Almesfer | |
| 2012/0237319 A1 | 9/2012 | Jacobsen et al. | |
| 2012/0330395 A1 | 12/2012 | Dar et al. | |
| 2014/0058299 A1 | 2/2014 | Sankai et al. | |
| 2014/0188275 A1 * | 7/2014 | Lee | B25J 5/007 |
| | | | 901/8 |
| 2017/0056275 A1 * | 3/2017 | Lee | A61H 1/0255 |
| 2017/0165145 A1 * | 6/2017 | Aryananda | A61H 3/04 |
| 2018/0221226 A1 | 8/2018 | Moore et al. | |
| 2019/0151183 A1 * | 5/2019 | Kazerooni | B25J 9/0006 |
| 2019/0167507 A1 | 6/2019 | McKay | |
| 2019/0183715 A1 | 6/2019 | Kapure et al. | |
| 2019/0201259 A1 | 7/2019 | Hanley | |
| 2019/0216674 A1 * | 7/2019 | Maggu | A61H 3/04 |
| 2019/0247696 A1 | 8/2019 | Park et al. | |
| 2019/0247697 A1 * | 8/2019 | Park | A63B 21/4011 |
| 2020/0268308 A1 | 8/2020 | Sankai | |
| 2020/0281801 A1 | 9/2020 | Karlovich | |
| 2020/0353308 A1 | 11/2020 | Kim et al. | |
| 2021/0121343 A1 * | 4/2021 | Lonner | B25J 11/009 |
| 2021/0286353 A1 | 9/2021 | Takenaka et al. | |
| 2022/0212345 A1 * | 7/2022 | Smith | B25J 9/1682 |
| 2022/0314428 A1 * | 10/2022 | Takenaka | B25J 13/04 |

FOREIGN PATENT DOCUMENTS

| | | |
|---|---|---|
| DE | 102017127568 B3 | 5/2019 |
| DE | 202019002639 U1 | 10/2019 |
| EP | 2451423 B1 | 1/2015 |
| EP | 2853249 A1 | 4/2015 |
| EP | 3141231 A2 | 3/2017 |
| EP | 3960390 A1 | 3/2022 |
| FR | 3039449 A1 | 2/2017 |
| WO | WO 90/08669 | 8/1990 |
| WO | WO 2016/170364 A1 | 10/2016 |
| WO | WO 2019/022676 A1 | 1/2019 |
| WO | WO 2021/245317 A1 | 12/2021 |
| WO | WO 2024/092201 A1 | 5/2024 |

OTHER PUBLICATIONS

International Search Report for International Application No. PCT/US2024/010954 dated Apr. 17, 2024, 13 pages.
International Search Report for International Application No. PCT/US2024/010956 dated Apr. 17, 2024, 12 pages.

* cited by examiner

WALK-ABOUT EXOSKELETON

CROSS-REFERENCE TO RELATED APPLICATIONS

This application claims the benefit of U.S. Provisional Application No. 63/437,989 filed Jan. 9, 2023, and entitled, "WALK-ABOUT EXOSKELETON," which is incorporated by reference herein in its entirety.

BACKGROUND

A wide variety of exoskeleton, humanoid, robotic arms, and other robots or robotic systems exist which perform tasks in a variety of situations and applications. Robotic exoskeletons in particular are wearable electromechanical devices that have been developed as augmentative devices to assist, enhance, or amplify the physical performance of the wearer or as orthotic devices for gait rehabilitation or locomotion assistance. Robotic exoskeletons have potential applications in multiple different fields and may be used by a variety of different operators. While many exoskeleton systems comprise an upper body exoskeleton portion supported by a lower body exoskeleton portion (e.g., one comprising two legs) that interfaces with the lower body of a human operator upon the operator donning the exoskeleton, lower body exoskeletons are often complex in their configuration by comprising multiple actuatable joints to facilitate movement in multiple degrees of freedom that resemble as closely as possible the kinematics of the human operator due to these being physically coupled to the human operator, namely to the legs of the human operator. This level of complexity within a lower body exoskeleton portion in many instances is not necessary. Indeed, there are many instances where the types of amplified or assisted movements and/or maneuvers that a human operator may need to perform with the lower body exoskeleton portion in order to complete one or more tasks with the upper body exoskeleton are simple, thus rendering a complex lower body exoskeleton portion unnecessary in that it possesses a much greater capability than what is needed. Another way of stating this is that a complex exoskeleton may possess actuatable joints, degrees of freedom and various components, elements and systems needed to operate the lower body exoskeleton portion as it is interfaced with a human operator that are only there due to the complex configuration of the lower body exoskeleton to enable the human interface. However, in reality, such complexities may be overkill for many tasks that need to be carried out using the upper body exoskeleton portion. While a complex lower body exoskeleton portion can certainly perform simple amplified or movements and/or maneuvers, such as serving as a support for the upper exoskeleton portion as interfaced with an upper body of the user, facilitating amplified lifting, squatting, bending over, walking from one location to another, etc. by the operator, it likely does these utilizing all available systems, components, degrees of freedom, etc. within the lower body exoskeleton portion. In addition, it is recognized that in some instances a lower body exoskeleton portion may merely serve as a support for the upper exoskeleton portion, such as for a task that can be undertaken and accomplished using only the upper body exoskeleton portion. A complex lower body exoskeleton can be costly and can also be cumbersome, particularly when performing lower body movements and/or maneuvers, such as walking, squatting, and even standing for an extended period of time due to the direct interfacing of the lower body exoskeleton with the human operator.

SUMMARY

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

According to one example of the present disclosure, a walk-about exoskeleton system can comprise an exoskeleton, and a walk-about platform in support of the exoskeleton. The walk-about platform can be maneuverable about a ground surface. The walk-about platform can comprise a conveyance system operable with the walk-about platform. The conveyance system can be operable to facilitate movement of the walk-about platform about the ground surface. The walk-about platform can also comprise a bi-pedal locomotion zone. The bi-pedal locomotion zone can be defined, at least in part, by the walk-about platform can provide clearance for bi-pedal locomotion of an operator donning the exoskeleton.

In some examples, the walk-about platform can further comprise a walk-about base, and a mast extending up from the walk-about base. The exoskeleton can be mounted to the mast so as to position the operator in the bi-pedal locomotion zone upon donning the exoskeleton. In one example, the exoskeleton can be coupled to the mast. In one example, the exoskeleton can be vertically adjustable along the mast.

In some examples, the exoskeleton can further comprise a torso member and a mast interface member. The torso member and mast interface member can rotate relative to one another about an axis of rotation at a torso-forebend joint. In one example, the relative rotation of the torso member and the mast interface member about the axis can be powered by an actuator. In one example, a winch system can be coupled between the mast and the exoskeleton. The winch system can be operable to rotate the torso member relative to the mast interface member about the axis of rotation at the torso-forebend joint.

In some examples, the bi-pedal locomotion zone comprises an area defined by a plurality of ground-contacting rollers of the conveyance system. The ground contacting rollers can be disposed on the walk-about base. A center of gravity of the walk-about exoskeleton system can be maintained within the area to avoid tipping during use.

In some examples, the walk-about exoskeleton system can comprise a power source supported by the walk-about base. The power source can be supported at a position operable to maintain the center of gravity within the area to avoid tipping during use. The power source can be supported by the walk-about base at a position rearward of the operator.

In some examples, the walk-about base can comprise a support bridge and first and second lateral members extending outward from the support bridge below the exoskeleton. The first and second lateral members can define, at least in part, the bi-pedal locomotion zone. The first and second lateral members can each comprise front and rear wheels.

In some examples, the walk-about exoskeleton system can further comprise a detachable counterweight that is operable to selectively attach to the walk-about base. The counterweight can comprise one or more batteries.

In some examples, the walk-about exoskeleton system can further comprise an extendable arm supported by the walk-about base. The extendable arm can be extendable and retractable in a direction away from a direction of the first and second lateral members. An actuator can be operable to facilitate extension and retraction of the extendable arm.

In some examples, the walk-about exoskeleton system can further comprise first and second forks extending from the first and second lateral members, respectively. The first and second forks can be actuatable to carry a load. The first and second forks can operable to move from a stowed position to a deployed position. In one example, the first and second forks are retractable into the first and second lateral members. In one example, the first and second forks are rotatable relative to the first and second lateral members to move from the stowed position to the deployed position.

In some examples, the first and second lateral members can each comprise a retractable extension operable to selectively extend and retract from the first and second lateral members, respectively. The ground-contacting rollers can comprise front and rear ground-contacting rollers. The front ground contacting rollers can be disposed on the retractable extensions of the first and second lateral members, respectively. In some implementations, the walk-about base can comprise an actuator in each of the first and second lateral members that can be operable to extend and retract the retractable extensions. In other implementations, the front ground contacting rollers can each include an actuator that can be operable to extend and retract the retractable extensions.

In some examples, the conveyance system can be operably integrated with a remote navigation system via an interface that connects the walk-about exoskeleton to the remote navigation system. The remote navigation system can be configured to facilitate movement of the walk-about platform about the ground surface in at least one of a riding mode, a remote mode, or an autonomous mode.

In another example according to the present disclosure, a walk-about platform operable to support a wearable exoskeleton is provided. The walk about platform can comprise a conveyance system operable to facilitate movement of the walk-about platform about a ground surface, and a bi-pedal locomotion zone defined, at least in part, by the walk-about platform that provides clearance for bi-pedal locomotion of an operator.

In some examples, the conveyance system can be operably integrated with a remote navigation system via an interface that connects the walk-about exoskeleton to the remote navigation system. The remote navigation system can be configured to facilitate movement of the walk-about platform about the ground surface in at least one of a riding mode, a remote mode, and an autonomous mode.

In another example according to the present disclosure, a walk-about exoskeleton system can comprise an exoskeleton and a walk-about platform in support of the exoskeleton. The walk-about platform can be maneuverable about a ground surface. The walk-about platform can comprise a conveyance system operable with the walk-about platform. The conveyance system can be operably integrated with a remote navigation system via an interface that connects the walk-about exoskeleton to the remote navigation system. The remote navigation system can be configured to facilitate movement of the walk-about platform about the ground surface in an autonomous mode.

In some examples, the conveyance system can also be configured to facilitate movement of the walk-about platform about the ground surface in a riding mode or a remote mode.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figures 1, 2:
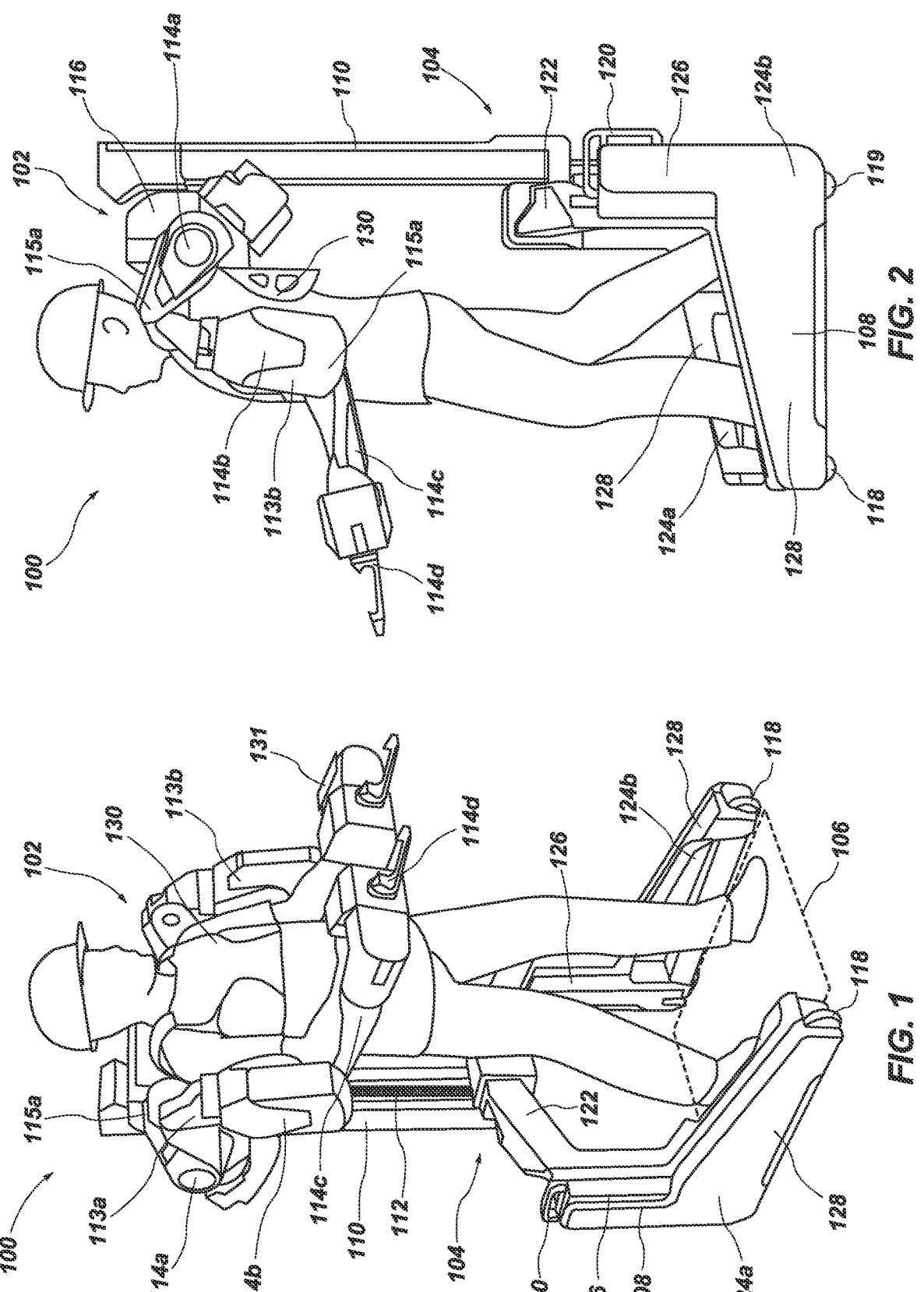
FIG. 1 is a front isometric view of a walk-about exoskeleton system according to one example of the present disclosure.
FIG. 2 is a side view of the walk-about exoskeleton system shown in FIG. 1.
Figures 3, 4:
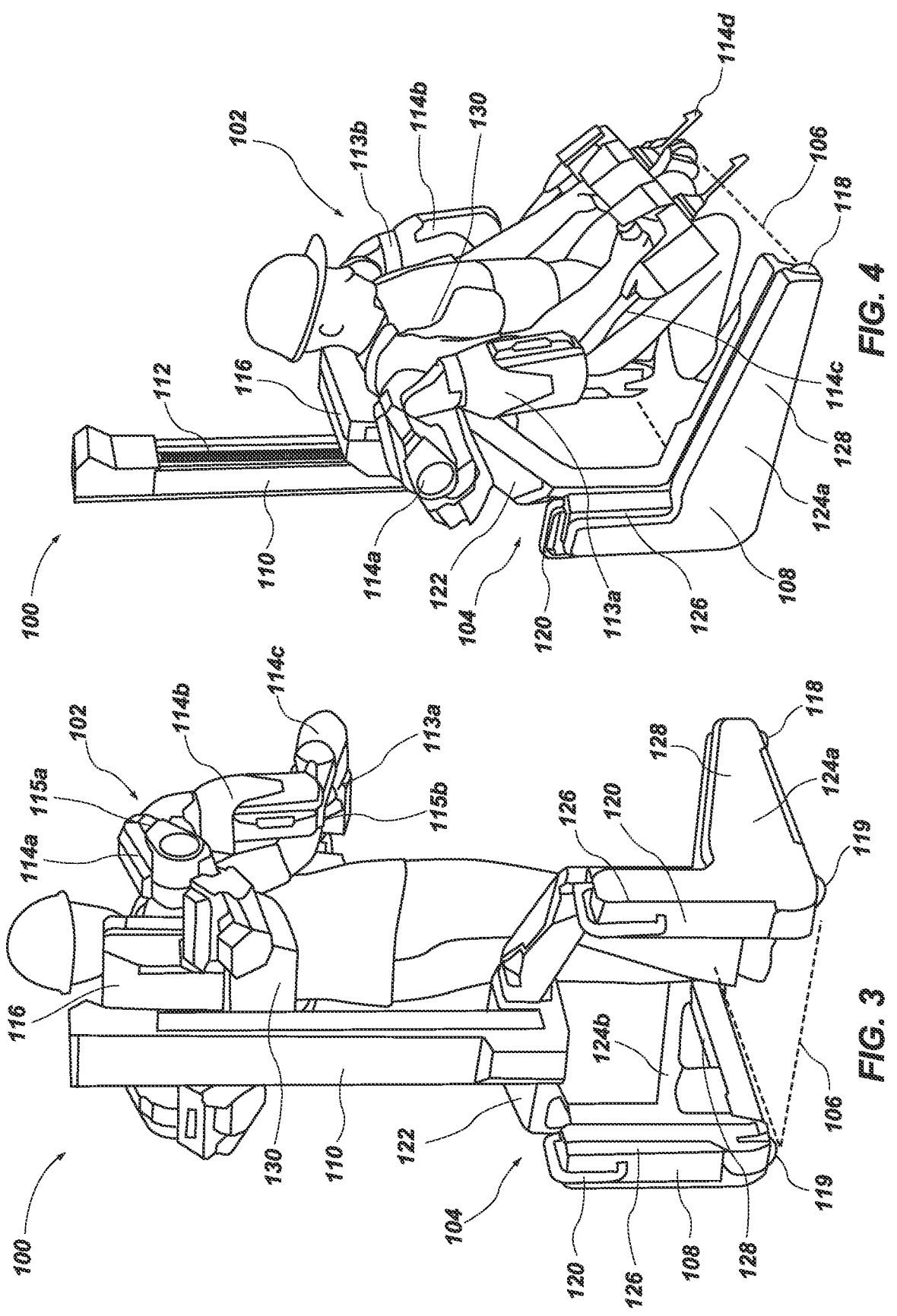
FIG. 3 is a rear isometric view of the walk-about exoskeleton system shown in FIG. 1.
FIG. 4 is a front isometric view of the walk-about exoskeleton system shown in FIG. 1 with an operator in a crouched position.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "walk-about" refers to a type and characteristic of a lower support system, namely a walk-about platform, for an upper body exoskeleton in which the lower support system is capable of locomotion and movements about a ground or other surface that correspond to operator locomotion and movements with the operator donning the upper body exoskeleton. While the operator is interfaced with (e.g., coupled to) and donning the upper exoskeleton, the legs of the operator are not coupled to the walk-about platform. In other words, the operator can achieve locomotion and other movements about a ground or other surface under the operator's own power and with the operator's legs decoupled from the walk-about platform with the walk-about platform following along. The operator locomotion and movements can be performed within a bi-pedal locomotion zone defined at least in part by one or more structural elements of the walk-about platform.

To further describe the present technology, examples are now provided with reference to the figures. With reference to FIGS. 1-4, a walk-about exoskeleton system 100 is provided. The walk-about exoskeleton system 100 can comprise an exoskeleton 102 (e.g., an upper exoskeleton) and a walk-about platform 104 in support of the exoskeleton about a ground surface or ground-like surface. The walk-about platform 104 can provide, as one advantage, a lower support system for an upper body exoskeleton portion that does not directly interface with and couple to the legs of a human operator, and thus does not need to match or even closely conform to the kinematics of the legs of the human operator, thus reducing the complexity of the walk-about platform 104 as compared with other lower body exoskeleton portions that do interface with the legs of a human operator and that comprise various actuated joints and associated degrees of freedom that resemble or match the kinematics of the lower body of the human operator.

The exoskeleton 102 can be any suitable robotic exoskeleton operable to amplify the movement and/or work of an operator donning the exoskeleton 102. Therefore, the exoskeleton 102 shown is not intended to be limiting in any way except as otherwise described herein. As in the example shown, the exoskeleton 102 can comprise a plurality of robotic limbs such as a right robotic limb 113a that can correspond to a right arm of the operator and a left robotic limb 113b that can correspond to a left arm of the operator. The right robotic limb 113a can amplify the movement performed by the right arm of the operator and the left robotic limb 133b can amplify the movement performed by the left arm of the operator.

Each of the right and left robotic limbs 113a, 113b can comprise structural support members in the form of limb members 114a, 114b, 114c that can move in one or more degrees of freedom relative to one another, respectively, via joints 115a, 115b, respectively, at which the limb members 114, 114b, 114c connect. The degrees of freedom of movement of the exoskeleton 102 can correspond to respective degrees of freedom of movement of a human. The exoskeleton 102 can comprise various joint actuation systems (e.g., comprising one or more actuators, transmissions, clutches, or other components) to power the relative rotation between two or more of the limb members 114a, 114g, 114c based on input from the operator (such as movement of an arm of the operator) to amplify the movements of the operator. Each of the right and left robotic limbs 113a, 113b can comprise and end effector 114d. The end effector shown in the figures is exemplary and any suitable end effector can be utilized based on a desired task to be performed by the walk-about exoskeleton system 100. Such end effectors can include robotic hands, grippers, tools, magnets, cameras, or the like, or any combination of these.

The exoskeleton 102 can comprise a support bridge 116, and the right and left robotic limbs 113a, 113b can each be attached to and extend from the exoskeleton support bridge 116. For example, the right and left robotic limbs 113a, 113b can be attached to the support bridge at respective joints. A joint assembly can be provided at the joint between the robotic limbs 113a, 113b and the support bridge 116 that can facilitate relative movement between the robotic limbs 113a, 113b and the support bridge 116. The joint assembly can comprise, for example, one or more actuators, transmissions, or connectors that facilitate the relative movement between the robotic limbs 113a, 113b and the support bridge 116. The support bridge 116 can be designed and configured to be supported in a position behind an operator operating the walk-about exoskeleton system 100, such as about the shoulders and upper back of the operator. The exoskeleton support bridge 116 can be operable to connect to and be supported from the walk-about platform 104 as will be describe in more detail below.

The walk-about platform 104 can comprise a walk-about base 108 supporting a mast 110. The walk-about base 108 and the mast can be formed integrally as a single piece, or the mast 110 can be attached to the walk-about base through any suitable joining mechanism such as via welding, adhesives, fasteners, etc. The mast 110 can extend upwards from the walk-about base 108 and can be supported about the walk-about base 108 so as to be positioned behind the operator operating the walk-about exoskeleton system 100. The mast 110 can be operable to support the exoskeleton 102. In one example, the exoskeleton 102 can be mounted to or attached to the mast 110, such as via the support bridge 116, so as to position an operator donning the exoskeleton 102 within a bi-pedal locomotion zone 106 defined at least in part by the walk-about base 108.

In some examples, the exoskeleton 102 can be mounted or attached to the mast 110 such that the exoskeleton 102 is able to move in one or more degrees of freedom relative to the mast 110. In one example, the exoskeleton 102 can be moveably mounted to the mast 110 so as to be able to move vertically or up and down (as shown in FIGS. 1-4) with respect to the mast 110. To this end, and in one example, the mast 110 can comprise a linear actuator 112 that facilitates the vertical movement of the exoskeleton 102 relative to the mast 110. The linear actuator 112 can be any suitable actuator such as a mechanical linear actuator (e.g., a screw or chain drive), a pneumatic linear actuator, or a hydraulic linear actuator. The movement of the exoskeleton 102 relative to the mast 110 can facilitate operators of different heights who use the walk-about exoskeleton system 100. Further, the movement of the exoskeleton 102 relative to the mast 110 can also allow an operator to move into different positions, such as a lower position (e.g., a squatting position (such as the position shown in FIG. 4)) so that the operator can perform a needed or desired work or a task. For example, moveably coupling the exoskeleton 102 to the mast 110 allows an operator to lower his/her body from a standing position to a lower position to perform a task that cannot be done from a standing position, such as to lift an item off of a ground surface, place an object on a lower shelf, and countless other tasks with the aid of the exoskeleton 102.

Figure 5:
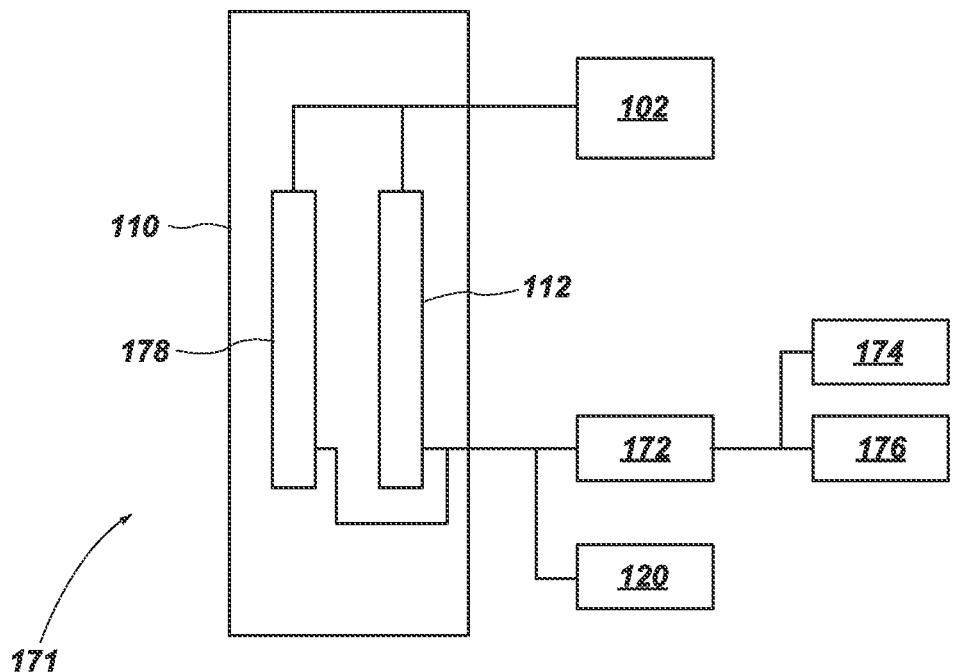
FIG. 5 shows a schematic of an interface between a mast and an exoskeleton of the walk-about exoskeleton system according to one example of the present disclosure.

FIG. 5 shows a schematic of a mast exoskeleton interface system 171 that provides an interface between the mast 110 and the exoskeleton 102 according to one example of the present disclosure. Referring now to FIGS. 1-5, in some examples, the exoskeleton 102 is attached to the mast 110 such that it is able to move in one or more degrees of freedom as mentioned above. As shown in FIGS. 1-5, the exoskeleton 102 can be configured to move vertically up or down relative to the mast 110. The interface system 171 can facilitate the relative movement between the mast 110 and the exoskeleton 102. For example, the mast exoskeleton interface system 171 can comprise the linear actuator 112 discussed above. The exoskeleton 102 can connect to the mast 110 via the linear actuator 112. As mentioned above, the linear actuator 112 can be any suitable linear actuator now known or later developed. The linear actuator 112 can be configured based on an expected load resulting from both the weight of the exoskeleton 102 and a weight of a load carried by the exoskeleton 102. That is, the type and size of the linear actuator 102 can be selected to be suitable to accommodate an expected maximum load (e.g., the combined weight of the exoskeleton 102 and the maximum expected load to be carried by the exoskeleton 102).

In some examples, the linear actuator 112 can comprise a backdrivable actuator (i.e., an actuator that will operate in reverse when acted upon by an external force, and thus requires continual power to maintain position in the presence of an external force). In some examples, the linear actuator 112 can comprise a nonbackdrivable actuator (i.e., an actuator that maintains its position unpowered in the presence of an external force). In some applications, a backdrivable actuator can provide increased responsiveness as compared to a nonbackdrivable actuator. In some applications, a nonbackdrivable actuator can decrease power requirements for the actuator by its ability to maintain its position in an unpowered state.

In one example, the mast exoskeleton interface system 171 can include passive gravity compensation that can aid in supporting the weight of the exoskeleton 102 and any load carried by the exoskeleton 102. For example, the mast exoskeleton interface system 171 can comprise a passive actuator 178. A passive actuator as used herein can comprise an actuator that is unpowered and that provides a reactive force in response to a load exerted on the passive actuator. For example, the passive actuator can comprise a mechanical spring, a pneumatic passive actuator (i.e., an air spring)

or the like. The passive actuator 178 can be configured to provide gravity compensation to support the weight of the exoskeleton 102, and optionally the load carried by the exoskeleton 102. The passive actuator can be attached to the exoskeleton 102 in parallel with the linear actuator 112 as shown in FIG. 5.

For example, the passive actuator 178 can be configured to compensate for the weight of the exoskeleton 102. In other words, the passive actuator 178 can be configured such that the passive actuator 178 can provide a reaction force equal to the weight of the exoskeleton 102. Accordingly, the passive actuator 178 can be configured to maintain a vertical position of the exoskeleton 102 relative to the mast 110 without aid from the linear actuator 112. Because the passive actuator 178 provides the necessary force to support the weight of the exoskeleton, the linear actuator 112 need only be sized and configured to move the exoskeleton 102 vertically and to support the weight of a load carried by the exoskeleton 102. In this manner, the power required from the linear actuator 112 can be less than compared to when no passive actuator 178 is incorporated into the mast exoskeleton interface system 171. This can provide energy savings and can allow for the option to incorporate a smaller, less powerful linear actuator into the mast exoskeleton interface system 171 as compared to when no passive actuator 178 is used.

In another example, the passive actuator 178 can be configured to compensate for the weight of the exoskeleton 102 and at least part of the weight of an expected maximum load that will be carried by the exoskeleton 102. In other words, the passive actuator 178 can be configured such that the passive actuator can provide a reaction force equal to the weight of the exoskeleton 102 and at least a portion of a load carried by the exoskeleton 102. In this example, additional energy savings can be attained when the exoskeleton 102 carries a load because the passive actuator 178 can bear both the weight of the exoskeleton 102 and a portion of the load.

In the instance where no load is carried by the exoskeleton 102, the linear actuator 112 can be required to work against the passive actuator 178 in order to maintain the unladen exoskeleton 102 in a given position relative to the mast 110. Thus, the determination of the strength of the passive actuator 178 can be based on an expected percentage of time of operation during which the exoskeleton 102 will bear a given load. It is noted that while in the above examples the passive actuator 178 is configured to bear the weight of the exoskeleton 102 or the weight of the exoskeleton 102 and a load, this is not intended to be limiting. The passive actuator 178 can be configured to provide any desired reaction force based on a given application, such as a reaction force that is less than a weight of the exoskeleton.

While only a single passive actuator 178 is shown in FIG. 5, it is noted that multiple passive actuators could be used. For example, a first passive actuator could be provided that is configured to compensate for the weight of the exoskeleton. A second passive actuator could also be provided that is configured to compensate for at least a portion of the weight of an expected load. In some examples, one or more of the passive actuators can be activated or inactivated. For instance, the second passive actuator that is configured to compensate for at least a portion of the weight of an expected load can be configured to be activated or inactivated depending on whether a load is carried by the exoskeleton 102. When a load is carried by the exoskeleton 102, the second passive actuator can be activated to provide gravity compensation for the load. When the exoskeleton 102 is unladen, the second passive actuator can be deactivated so that is does not provide extra reaction force greater than the weight of the exoskeleton 102. One or more of the actuators can be activated and deactivated via any suitable mechanism such a clutch, a control valve (in the case of a pneumatic actuator), or the like.

Control of the linear actuator 112 and optionally control of activating and deactivating the passive actuator 178 can be provided by a control unit 172 of the mast exoskeleton interface system 171. The control unit 172 can comprise a processor and one or more non-transitory storage media that can store control instructions which are executable by the processor. The control unit 172 can send control instructions to the linear actuator 112 to power the linear actuator 112 such that the linear actuator 112 is actuated to move the exoskeleton vertically relative to the mast 110. The control unit 172 can also send control instructions to the passive actuator 178 to activate or deactivate the passive actuator 178 if desired.

The control instructions generated by the control unit 172 to actuate the linear actuator 112 can be based on one or more inputs received at the control unit 172. For example, the mast exoskeleton interface system 171 can comprise a sensor 174 that can be strategically supported and located to be able to sense the operator donning the exoskeleton 102. For example, the sensor 174 can be deployed to measure or determine a vertical movement of the operator, such as when an operator crouches down into a squatting position or stands up from a squatting position. In some examples, the sensor 174 can be attached to, integrated with, or otherwise operable with a harness 130 that is coupled to the exoskeleton 102 and that is sized and configured to interface with the operator. In the example shown, the harness 130 can be sized and configured to be worn about the shoulders and torso of the operator.

The sensor 174 can comprise any suitable variety or type of sensor. In one example, the sensor 174 can comprise a force sensor such as a six-degree of freedom force moment sensor strategically located on and supported by the harness 130, wherein the six degree of freedom force moment sensor can be utilized to sense the movement of the operator via the harness 130. In another example, the sensor 174 can comprise a position sensor. The position sensor can be a displacement sensor that detects a position of the operator as the operator stands up or squats down. Of course, while a single sensor 174 is shown in FIG. 5, it should be understood that a combination of multiple sensors could also be used to provide input to the control unit 172.

In another example, the mast exoskeleton interface system 171 can comprise a user input device 176 that the operator can manually interact with to initiate and control movement of the exoskeleton 102 relative to the mast 110. The user input device 176 can provide input to the control unit 172 to facilitate the movement of the exoskeleton 102 relative to the mast 110. The user input device 176 can be configured to provide the operator with the ability to manually provide control instructions to the control unit 172 to facilitate the movement of the exoskeleton 102 relative to the mast 110 (i.e., the operator can directly control the movement of the exoskeleton 102 relative to the mast 110 by manipulating the input device 176).

For example, the input device 176 can comprise a wireless transceiver that is operable to wirelessly send and receive information from a remote device, such as a mobile phone 131 or the like. The transceiver can be operable to wirelessly receive and transmit information via any suitable wireless protocol such as Bluetooth, Wi-Fi, NFC, or the like. The exoskeleton 102 can, for example, have a mounting receiver for a mobile phone 131. The operator can operate the mobile phone 131 which can run an application that is operable to wirelessly transmit information to the wireless transceiver. The information can comprise control instructions for moving the exoskeleton to a desired height relative to the mast 110. In another example, the input device 176 can comprise a wired transceiver that can connect to a remote device via a wired connection. For example, the exoskeleton 102 can comprise a mobile device dock to which the mobile phone 131 can connect via a wired connection. The input device 176 can also comprise other devices to provide input such as a joystick, a keyboard, or other known input devices. While one input device 176 is shown in FIG. 5, it should of course be understood that a combination of multiple input devices could also be used.

Each of the above-mentioned features of the mast exoskeleton interface system 171 can be connected to a power source 120 such as a battery that powers the walk-about exoskeleton system 100. The power source 120 can be advantageously stowed on the walk-about exoskeleton system 100 to provide balance to the system as will be discussed in more detail below.

When an operator moves vertically relative to the mast 110 while wearing the exoskeleton 102 of the walk-about exoskeleton system 100, the operator can cause the mast exoskeleton interface system 171 to move the exoskeleton 102 in a desired up-or-down direction and at a desired speed. For example, the operator can wear the harness 130 in conjunction with donning the exoskeleton 102. When the operator begins move vertically, such as to stand up or squat down, the sensor 174 can detect the operator's movement and transmit information regarding the operator's movement to the control unit 172 of the mast exoskeleton interface system 171. The control unit 172 can cause the linear actuator 112 to move the exoskeleton 102 based on the information received.

In one example, the sensor 174 can comprise a six degree of freedom force moment sensor as mentioned above. The sensor 174 can be operable to detect a force caused by the movement of the operator as the operator begins to stand up or squat down. The sensor 174 can detect a magnitude and a direction of the force which can correspond with an acceleration of the operator. The control unit 172 can receive information regarding the force sensed by the sensor 174. Based on the information received, the control unit 172 can send instructions to the linear actuator 112 such that the exoskeleton 102 moves in the same direction and speed as the operator. In one example, the control unit 172 can direct the linear actuator 112 to move the exoskeleton relative to the mast in such a manner as to continually attempt to zero out the force sensed by the sensor 174.

In another example where the sensor 174 comprises a position sensor such as displacement sensor, the sensor 174 can detect a direction and a magnitude of displacement caused the by operator beginning to stand up or squat down. The control unit 172 can receive information regarding the displacement of the sensor 174. Based on this information, the control unit 172 can send instructions to the linear actuator 112 such that the exoskeleton 102 moves in the same direction and speed as the operator. For example, the control unit 172 can direct the linear actuator 112 to move the exoskeleton 102 relative to the mast 110 in such a manner as to continually attempt to zero out the displacement sensed by the sensor 174.

In another example, the operator can control the movement of the walk-about platform 104 directly via the user input 176. For example, the operator can use a mobile device 131 to send control instructions to the control unit 172 via a wired or wireless input device 176. Based on the input received at the control unit 172, the control unit 172 can send control instructions to the actuator 112 to move the walk-about exoskeleton vertically in accordance with the input provided by the operator. The operator can similarly manually control the movement of the walk-about exoskeleton 102 relative to the mast 110 via another input device such as via a joystick, keyboard, or the like.

Referring again to FIGS. 1-4. The walk-about base can comprise a first lateral member 124a and a second lateral member 124b. The first and second lateral members 124a, 124b can be joined by a support bridge 122. The support bridge 122 can space apart the first and second lateral members 124a, 124b and can also provide the supporting structure for the mast 110. In one example shown in FIGS. 1-4, each of the first and second lateral members 124a, 124b can comprise a vertical portion 126 connected to the support bridge 122 and a horizontal portion 128. The support bridge 122 can be located at any position relative to the ground surface. In one example, the vertical portions 126 can be configured so as to locate the support bridge 122 at a position and height so as to be behind the knees of the operator, thus reducing the likelihood that the support bridge 122 will interfere with the operator's movements while operating the walk-about exoskeleton system 100, such as during a gait cycle of the operator.

The horizontal portions 128 can extend from a bottom of the vertical portions 126 along the sides of the operator. That is, the horizontal portions 128 can extend from the rear of the operator where the horizontal portions 128 join the vertical portions 126 towards a front of the operator. The horizontal portions 128 can comprise front rollers 118 and rear rollers 119. For purposes of this description, front indicates the direction the operator faces while donning the exoskeleton 102, and rear indicates the direction opposite the direction the operator faces. The front and rear rollers 118, 119 can be any suitable type of rollers facilitating movement of the walk-about exoskeleton system about a ground surface. For example, the rollers 118, 119 can comprise wheels or tracks. In some examples, instead of front and rear rollers 118, 119, the rollers can comprise a single roller on each lateral member 124a, 124b in the form of a track that extends the length of the horizontal portion 128 (see FIG. 11). The rollers 118, 119 can comprise wheels or tracks which can be omnidirectional wheels or omnidirectional tracks. Each of the front rollers 118 and the rear rollers 119 can be actuated to move the walk-about exoskeleton system 100 as discussed in more detail below. In some examples, just the front rollers 118 or the rear rollers 119 can be actuated while the other of the front rollers 118 or the rear rollers 119 can be passive (i.e., are not actuated but roll freely). In some examples, all of the rollers 118, 119 are passive and the walk-about exoskeleton system 100 can be moved by the strength of the operator or via another external force acting on the exoskeleton system 100.

The lateral members 124a, 124b and support bridge 122 can define the bi-pedal locomotion zone 106. The bi-pedal locomotion zone 106 can comprise a space between the horizontal portions 128 of the lateral members 124a, 124b and in front of the support bridge 122 within which an operator donning the exoskeleton 102 can walk, run, or otherwise move about a ground surface. In other words, the bi-pedal locomotion zone 106 can comprise the space between the front rollers 118 and the rear rollers 119 as shown in FIGS. 1-4. Thus, while the operator is wearing the exoskeleton 102, the operator is positioned within the bi-pedal locomotion zone 106.

The vertical portions 126 of the lateral members 124a, 124b can be formed integrally with the horizontal portions 128 or can be coupled thereto. The vertical portions 126 can be further attached to or formed integrally with the support bridge 122. The vertical portions 126 can be sized and configured to receive and support a power source 120, such as a battery. Further, the vertical portions 126 can be positioned so as to be at the rear of the bi-pedal locomotion zone 106. This places the power source 120 (e.g., battery) at the rear of the bi-pedal locomotion zone 106. Typically, a power source 120 such as a battery can comprise a relatively large amount of weight. Thus, with the power source 120 being disposed on the vertical portions 126, the power source 120 can operate as a counterweight to the walk-about exoskeleton system 100. In other words, the power source 120 can help to stabilize the walk-about exoskeleton system 100 to prevent the walk-about exoskeleton system 100 from tipping during use. This is because the exoskeleton 102 and operator using the exoskeleton 102 pick up or otherwise interact with loads in front of the operator. The weight of the vertical portions 126 and power source 120 being behind the operator can provide a torque that counters the torque caused by the weight of the exoskeleton 102 and a load carried by the exoskeleton 102 to keep the walk-about exoskeleton system 100 from tipping. Of course, the power source 120 could be disposed at any position behind the operator during use such as on the support bridge 122.

With the power source 120 as a counterweight in a position at the rear of the walk-about exoskeleton system 100, or at the rear of the bi-pedal locomotion zone 106, the walk-about exoskeleton system 100 can maintain a center of gravity that falls within an area of the bi-pedal locomotion zone 106 (i.e., within an area between the front rollers 118 and the rear rollers 119) even when the exoskeleton 102 carries a load (that is within pre-determined specifications) in front of the operator. Because the power source 120 can operate as a counterweight at the rear of the bi-pedal locomotion zone 106, the walk-about exoskeleton system 100 can be operable to prevent tipping during operation by maintaining a center of gravity within an area of the bi-pedal locomotion zone 106. For example, even if an operator donning the exoskeleton 102 uses the robotic limbs 113a, 113b to carry a load in front of the operator, the walk-about exoskeleton system 100 can maintain a center of gravity within the bi-pedal locomotion zone 106 to avoid tipping due at least in part to the power source 120 (e.g. battery) being located at the rear of the bi-pedal locomotion zone 106 within the vertical portions 126 of the lateral members acting as a counterweight to the load carried by the exoskeleton 102. This is because the weight of the power source 120 at the rear of bi-pedal locomotion zone creates a torque acting on the walk-about platform 104 and the walk-about exoskeleton system 100 that acts in an opposite direction as the torque created by the load carried by the exoskeleton 102. Thus, the center of gravity can be maintained within the bi-pedal locomotion zone (or within an area defined by the front and rear rollers 118, 119) to prevent tipping.

In some examples, the power source 120 can be removable from the vertical portions 126 of the lateral members 124a, 124b. Thus, the power source 120 can be easily swapped for a new power source, for example, to quickly change from a depleted battery to a fully charged battery. In some examples, if even more counterweight is desired for a particular application, an additional counterweight can be provided that can be attachable to the walk-about base 104. For example, additional power sources 120 could be attached to the vertical portions 126 of the lateral members 124a, 124b or the support bridge 122. In some examples, a counterweight that is not a power source 120 could also be used. Further, the specific shape and configuration of the lateral members 124a, 124b, support bridge 122, and mast 110 are not limited to the exact features shown in FIGS. 1-4. It should be understood that modifications can be made while still facilitating a bi-pedal locomotion zone accommodating the operator and supporting structure behind the operator providing a counterweight to the exoskeleton 102 and load carried by the exoskeleton 102 to avoid tipping.

Figure 6A:
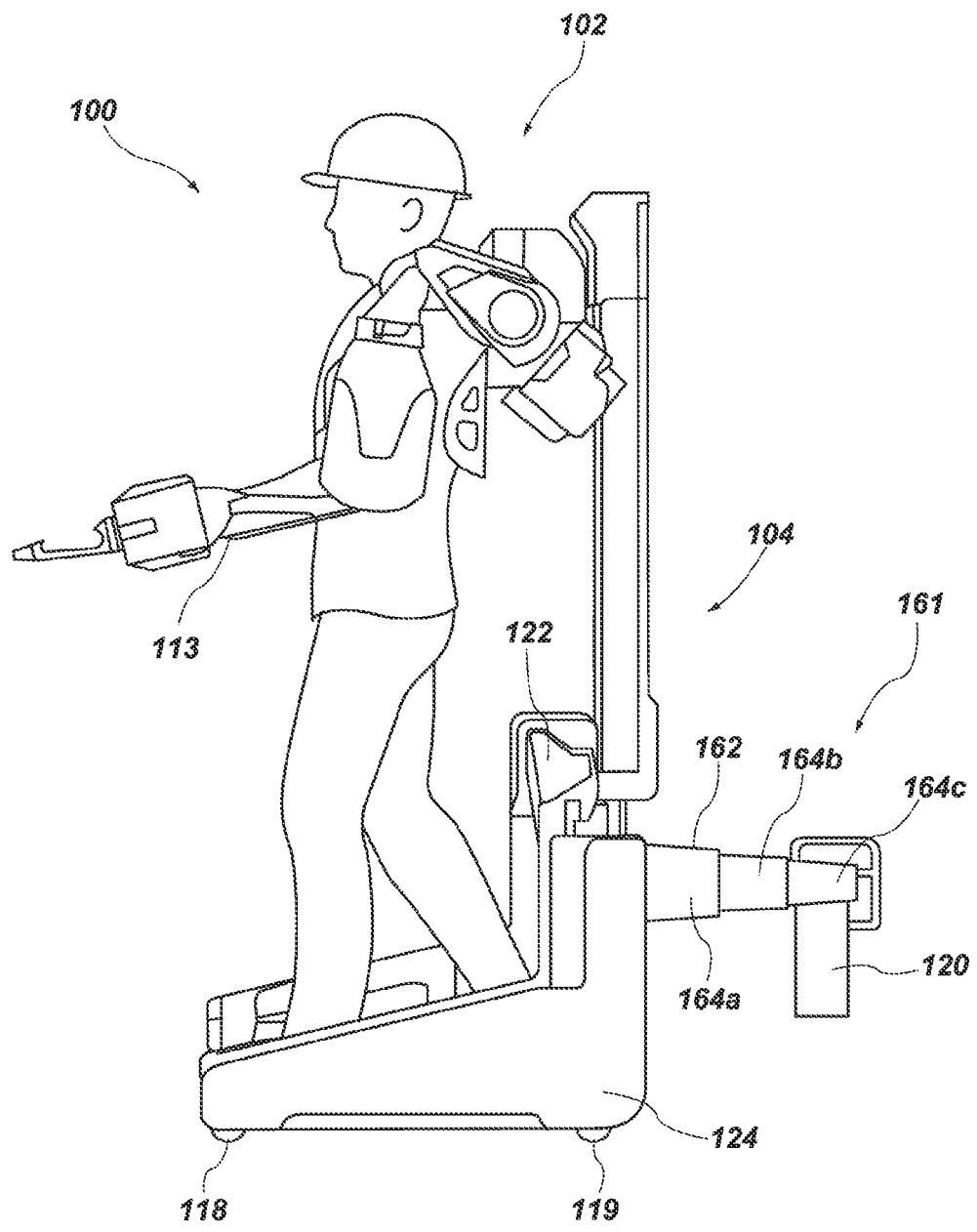
FIG. 6A is a side view of a walk-about exoskeleton system having an extendible counterweight according to one example of the present disclosure.

Other mechanisms to prevent tipping during use can also be incorporated into the walk-about exoskeleton system 100. For example, FIG. 6A shows a side view of the walk-about exoskeleton system 100 having a moveable counterweight system 161 according to one example of the present disclosure. As indicated, the exoskeleton system 100 can comprise a moveable counterweight system 161 operable to move and vary the location of the center of gravity of the walk-about exoskeleton system 100 during operation. The moveable counterweight system 161 can operate to vary the center of gravity to reduce the likelihood of, or to prevent altogether, tipping of the walk-about exoskeleton system 100. In this example, the moveable counterweight system 161 can provide an adjustable counterweight to counteract any loads or forces having a tendency to cause the walk-about platform 104 to tip. Such loads can change depending upon the tasks carried out using the walk-about exoskeleton system 100.

Generally speaking, the moveable counterweight system 161 can comprise a support arm and a weighted mass or counterweight coupled to or otherwise supported by the support arm. The support arm can be configured to facilitate movement of the counterweight into one of a plurality of positions relative to the walk-about platform 104. The support arm can be moved in response to or in preparation for loads acting on the walk-about exoskeleton system 100.

Figures 6B, 7:
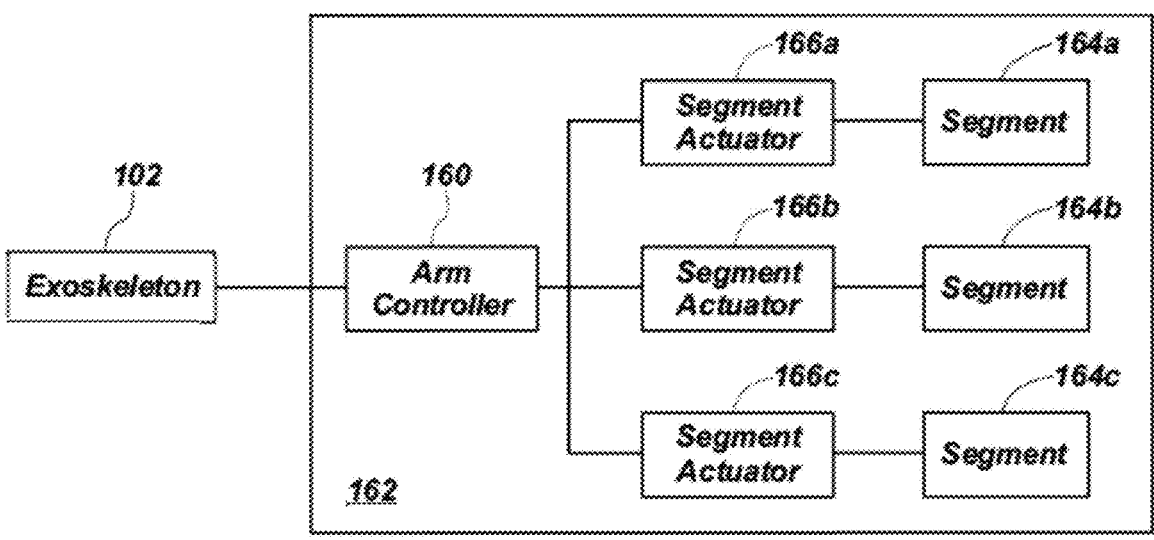
FIG. 6B is a schematic view of an extendible arm of the extendible counterweight of FIG. 6A.
FIG. 7 is a schematic view of user input interface in association with a conveyance system of the walk-about exoskeleton system shown in FIG. 1.

In one example, as shown in FIGS. 6A and 6B, the moveable counterweight system 161 can comprise a support arm in the form of an extendable arm 162. The extendable arm can be configured to support a counterweight. In some examples, the counterweight can comprise a power source 120, such as a battery. The extendable arm 162 can be a multi-segment arm having a first segment 164a, a second segment 164b, and a third segment 164c. While three segments 164a, 164b, 164c are shown in FIGS. 6A and 6B, any number of segments could be incorporated into the extendable arm 162. The segments 164a, 164b, 164c can be operable to move relative to one another such that the extendable arm 162 can extend and retract in a telescopic fashion. The extendable arm 162 can be coupled to the walk-about platform 104 at any location suitable to accomplish its intended purpose of preventing tipping of the walk-about exoskeleton system 100 by providing a counterweight to any loads or forces having a tendency to cause the platform 104 to tip. In the example shown, the extendable arm 162 can be coupled to the walk-about base 108, such as to the support bridge 122 or to one of the lateral members 124. In some examples, two extendable arms 162 (or more) can be utilized such as with one arm being attached to each of the lateral members 124 of the walk-about base 108.

The extendable arm 162 can be operable to carry the counterweight, in this example the power source 120, and to move the power source 120 into one of a plurality of positions relative to the walk-about platform 104 via movement of the extendable arm 162. In one example, the power source 120 shown can be one or more batteries. However, this is not intended to be limiting in any way. Indeed, in other examples, the counterweight can comprise any type of weighted mass, or any type of object, device, system, or any combination of these. In some examples, the counterweight can be attached to the outermost segment 164c of the extendable arm 162. In some examples, the counterweight can be removeable or replaceable. In some examples, the counterweight can be interchangeable with another counterweight of at least one of a different size, type or weight.

The support arm can be configured and operable to move in one or more degrees of freedom and along one or more axes to position the counterweight in one of a plurality of positions relative to the walk-about platform 104. In one example, as shown, the extendable arm 162 can be configured to extend and retract bi-directionally along an axis parallel to a ground surface. For example, as shown, the extendable arm 162 can extend outward and away from the walk-about platform 104 along an axis parallel to a ground surface, and in a direction opposite the direction in which the lateral members 124 extend (i.e., in a rearward direction, or in other words, a direction away from a back of the operator with the operator donning the exoskeleton 102). Likewise, the extendable arm 162 can be retracted in the opposite direction along the same axis.

In this manner, the extendible arm 162 can selectively move the counterweight 120 in a forward and rearward direction toward and away from the lateral members 124, thereby moving the center of gravity of the walk-about exoskeleton system 100 in a corresponding forward and rearward direction. By moving the counterweight in the forward and rearward directions, the counterweight can be positioned in one of a plurality of positions. This movement can allow the moveable counterweight system 161 to provide an appropriate countering torque that opposes a torque caused by lifting a load with the exoskeleton 102 in front of the operator. By countering the torque from the load with the moveable counterweight system 161, the center of gravity of the walk-about exoskeleton system 100 can be moved and maintained within an area defined by the lateral members 124. That is, the center of gravity can be moved to or maintained within the supports (i.e., the rollers 118 and 119) of the walk-about exoskeleton system 100 to avoid tipping (e.g., the center of gravity can be maintained within a bi-pedal locomotion zone such as the bi-pedal locomotion zone 106 in FIGS. 1-4).

Advantageously, the moveable counterweight system 161 (in any form or configuration) can be adjustable. In other words, the position of the counterweight relative to the walk-about platform 104 can be varied in order to vary the location of the center of mass of the walk-about exoskeleton system 100. This can reduce the likelihood of and/or prevent altogether the tipping of the walk-about exoskeleton system 100.

In some examples, the support arm, such as the exemplary extendable arm 162, can be actuated manually. In some examples, the support arm can be actuated automatically in response to a given load carried by the walk-about exoskeleton system 100. FIG. 6B is a schematic view of the exemplary extendable arm 162 of the walk-about exoskeleton system 100 of FIG. 6A. Referring to FIGS. 6A and 6B, the extendable arm 162 can comprise an arm controller 160 that controls the extension and retraction of the extendable arm 162. In this example, the extendable arm 162 can comprise the arm controller 160. However, the arm controller 160 could be incorporated into one or more other controllers or control systems of the walk-about exoskeleton system 100. For example, the controller 160 can be incorporated into same the same device as the control unit 172 discussed above, or can be separate controller from the control unit 172.

The arm controller 160 can be communicatively coupled to the exoskeleton 102, such that the arm controller 160 can receive information about a position of one or more of the limbs 113 of the exoskeleton 102 and/or a weight of a load carried by the limbs 113 of the exoskeleton 102. Based on the information received at the arm controller 160, a torque caused by a load carried by the exoskeleton 102 (e.g., a torque acting on the exoskeleton system 100 based on the position of the limbs 113 and/or the weight of the load carried by the exoskeleton 102) can be determined. If the torque is determined to have the potential to cause the walk-about exoskeleton system 100 to tip, the arm controller 160 can cause the extendable arm 162 to extend outwards in the rearward direction. This in turn can move the counterweight (in the form of the power source 120 in this example) in a rearward direction to a second position from a first position to increase a counter-torque provided by the counterweight 120 (i.e., by increasing a moment arm of the power source 120 counterweight relative to the walk-about platform 104 of the walk-about exoskeleton system 100) to oppose the torque caused by the load acting on the exoskeleton 102 and the position of the limbs 113. In some examples, the arm controller 160 can cause the extendable arm 162 to fully extend or to partially extend based on the information received at the arm controller 160 regarding the torque caused by the load carried by the exoskeleton 102.

In one example, the extendable arm 162 can comprise actuators 266a, 266b, 266c associated with the segments 164a, 164b, 164c, respectively. Each of the actuators 266a, 266b, 266c can comprise a linear or other type of actuator operable to extend and retract the associated segment 164a, 164b, 164c, respectively. For examples, the actuators 266a, 266b, 266c can be any suitable linear actuators including mechanical linear actuators, hydraulic linear actuators, pneumatic linear actuators, or the like. Of course, other types of actuators other than linear actuators can be employed to move the extendable arm 162. In addition, other types, different types, and any number of actuators can be employed to move the support arm, depending upon its configuration.

Those skilled in the art will appreciate that the support arm of the moveable counterweight system 161 that is shown as being in the form of an extendable arm 162 is not intended to be limiting in any way. Indeed, it is contemplated herein that the support arm of the moveable counterweight system 161 can be configured in a number of different ways, and can comprise a number of different types of mechanisms, components, etc. Indeed, any type of mechanism, system, and collection of components can be used to provide a support arm capable of moving a counterweight that is coupled to or otherwise supported by (e.g., integrally formed therewith) the support arm between a plurality of positions relative to the walk-about platform 104.

Returning the FIGS. 1-4, the walk-about exoskeleton system 100 allows an operator to move about a ground surface under his/her own power (e.g., walk, stand, squat, etc.) while amplifying the strength of the operator via the exoskeleton 102. FIG. 7 is a schematic view of a user input interface in association with a conveyance system of the walk-about exoskeleton system shown in FIG. 1. Referring to FIGS. 1-4 and 7, the walk-about platform 104 of the walk-about exoskeleton system 100 can comprise a conveyance system 150 comprising various components as discussed herein, wherein the conveyance system 150 is operable to initiate and control movements of the walk-about platform 104 about a ground surface via inputs from the operator. The walk-about platform 104 can also define, at least in part, the bi-pedal locomotion zone 106 that provides clearance for bi-pedal locomotion of an operator donning the exoskeleton. The conveyance system 150 can be communicatively coupled to a user input interface 151 to receive information from an operator of the walk-about exoskeleton system 100 to facilitate the movement of the walk-about platform 104 about the ground surface.

In some implementations, the walk-about exoskeleton 100 can include an interface 197 that can connect the walk-about exoskeleton 100 to the remote navigation system 195. The interface 197 can enable the walk-about exoskeleton 100 to be in operable communication with the remote navigation system 195. For example, the interface 197 can be an interface that enables electronic communication between the remote navigation system 195 and the walk-about exoskeleton 100 (e.g., at least one of log-in communication, status communication, or operational control communication). In some cases, the interface 197 may be associated with or integrated with one or both of the user interface input 151 or the control unit 152.

In one example, the user input interface 151 can comprise a plurality of sensors 154a, 154b, 154n (the letter "n" being used herein to represent and convey that any number of sensors (or other components, elements identified herein) are contemplated). In one example, the plurality of sensors 154a-n can be strategically supported and located to be able to sense the operator donning the exoskeleton 102. For example, one or more sensors of the plurality of sensors 154a-n can be deployed to measure or determine a speed and a direction in which the operator travels about the ground surface. In some examples, one or more sensors of the plurality of sensors 154a-n can be attached to, integrated with, or otherwise operable with a harness 130 that is coupled to the exoskeleton 102, and that is sized and configured to interface with the operator. In the example shown, the harness 130 can be sized and configured to be worn about the shoulders and torso of the operator.

The plurality of sensors 154a-n can comprise any one or more of a variety of different types. In one example, one or more sensors of the plurality of sensors 154a-n can comprise force sensors. For example, one or more sensors of the plurality of sensors 154a-n can comprise a six degree of freedom force moment sensor strategically located on and supported by the harness 130. The six degree of freedom force moment sensor can be utilized to sense the movement of the operator via the harness 130 as the operator walks, turns, squats, and/or returns to a standing position. These movements of the operator can induce a force on the walk-about exoskeleton system 100 through the harness 130 due to the movement of the operator relative to the walk-about exoskeleton system 100. The induced force can be sensed by the six degree of freedom force moment sensor. A corresponding speed and direction can be determined based on the sensed movements of the operator.

In another example, one or more sensors of the plurality of sensors 154a-n can comprise position sensors. For example, the position sensor can be a displacement sensor strategically located on and supported by the harness 130. The position sensor(s) can be operable to detect a position of the operator when the operator moves about the ground surface. The movement of the operator can cause a displacement in the position sensor via the harness 130 in one or more degrees of freedom. The displacement can be sensed by the displacement sensor, and a corresponding speed and direction of the operator can be determined based on the displacement caused by the movement of the operator.

Other types of sensors could also be utilized to provide information to the conveyance system 150 to determine the speed and direction in which the operator travels about the ground surface. For example, the sensors 154 can comprise one or more optical sensors or ultrasonic sensors. The optical sensors or ultrasonic sensors can be disposed on and supported anywhere on the walk-about base 104, such as in the lateral members 124 and/or the support bridge 122 of the walk-about base 104. The optical sensors or ultrasonic sensors can be configured, along with an image processor and/or an ultrasonic energy processor, to detect a position and orientation of the operator within the bi-pedal locomotion zone 106. For example, the optical sensors and/or ultrasonic sensors can detect the position and orientation of the operator's legs and/or feet within the bi-pedal locomotion. When the operator takes a step, the optical sensors and/or ultrasonic sensors can be configured to detect the direction and speed of the operator's legs/feet and can transmit corresponding processed information to the conveyance system 150 regarding the movement of the operator including a direction and speed within the bi-pedal locomotion zone 106.

In another example, the user input interface 151 can comprise a plurality of user input devices 156*a*, 156*b*, 156*n* that the operator can manually interact with to initiate and control movement of the walk-about platform 104. The user input devices 156*a-n* can provide input to the conveyance system 150 to facilitate the movement of the walk-about platform 104 about a ground surface. The user input devices 156*a-n* can be configured to provide the operator with the ability to manually provide control instructions to the conveyance system 150 to facilitate the movement of the walk-about platform 104 about the ground surface (i.e., the operator can directly control the movement of the walk-about platform 104 by manipulating one or more user input devices of the plurality of user input devices 156*a-n*).

For example, one of the input devices 156 can comprise a wireless transceiver that is operable to wirelessly send and receive information from a remote device, such as a mobile phone 131 or the like. The transceiver can be operable to wirelessly receive and transmit information via any suitable wireless protocol such as Bluetooth, Wi-Fi, NFC, or the like. The exoskeleton 102 can, for example, have a mounting receiver for a mobile phone 131. The operator can operate the mobile phone 131 which can run an application that is operable to wirelessly transmit information to the wireless transceiver. The information can comprise control instructions for moving the walk-about platform 104 in a desired direction at a given speed. In another example, the input devices can comprise a wired transceiver that can connect to a remote device via a wired connection. For example, the exoskeleton 102 can comprise a mobile device dock to which the mobile phone 131 can connect via a wired connection. The input devices 156 can also comprise other devices to provide input such as a joystick, a keyboard, or other known input devices.

The information from the user input interface 151 can be sent to the conveyance system 150 to facilitate the movement of the walk-about platform 104. In one example, the conveyance system can comprise a control unit 152, one or more actuators 158*a*, 158*b*, 159*a*, 159*b*, and the rollers 118, 119. The control unit 152 can comprise a processor and one or more non-transitory storage media that can store control instructions which are executable by the processor. The control unit 152 can be connected to the user input interface 151 to receive information from the sensors 154 and/or inputs 156 of the user input interface 151. It is noted that the control unit 152 can be incorporated into the same device as the control unit 172 and/or controller 160, or the control unit 152 can be an independent device.

The control unit 152 can be further connected to the one or more actuators 158*a*, 158*b*, 159*a*, 159*b* which can actuate the rollers 118, 119. The actuators 158*a*, 158*b*, 159*a*, 159*b* can comprise any suitable actuator to cause the rollers 118, 119 to move in a desired direction and at a desired speed. For example, the actuators 158*a*, 158*b*, 159*a*, 159*b* can comprise one or more electric motors that can control the rotation and/or orientation of the rollers 118, 119. In some examples, the actuators 158*a*, 158*b*, 159*a*, 159*b* can be connected to the rollers 118, 119 via transmissions. The actuators 158*a*, 158*b*, 159*a*, 159*b* can comprise front actuators 158*a*, 158*b* connected to each of the front rollers 118, respectively, and rear actuators 159*a*, 159*b* connected to each of the rear rollers 119, respectively. The conveyance system 150 can be connected to the power source 120 such as one or more batteries to power the control unit 152 and actuators 158*a*, 158*b*, 159*a*, 159*b*.

When an operator moves about a ground surface while wearing the exoskeleton 102 of the walk-about exoskeleton system 100, the operator can cause the walk-about platform 104 to move the walk-about exoskeleton system 100 in a desired direction and speed. For example, the operator can wear the harness 130 in conjunction with donning the exoskeleton 102. When the operator begins to walk within the bi-pedal locomotion zone 106, one or more of the sensors 154*a-n* can detect the operator's movement and transmit information regarding the operator's movement to the control unit 152 of the conveyance system 150. The control unit 152 can cause one or more of the actuators 158*a-b*, 159*a-b* to drive the rollers 118, 119 based on the information received.

In one example, one or more of the plurality of sensors 154*a-n* can comprise a six degree of freedom force moment sensor as mentioned above. The sensor can be operable to detect a force caused by the movement of the operator as the operator begins to walk or otherwise move within the bi-pedal locomotion zone 106. The sensor can detect a magnitude and a direction of the force which can correspond with an acceleration and direction of the operator. The control unit 152 can receive information regarding the force sensed by the sensor. Based on the information received, the control unit 152 can send instructions to one or more of the actuators 158*a*, 158*b*, 159*a*, 159*b* to actuate one or more of the rollers 18, 19 such that the walk-about platform 104 moves in the same direction as the operator. In one example, the control unit 152 can direct the actuators 158*a*, 158*b*, 159*a*, 159*b* to move the walk-about platform 104 in such a manner as to continually attempt to zero out the force sensed by the sensor 154. In this manner, the walk-about platform 104 can move in the same direction and speed as the operator.

In another example where one or more of the plurality of sensors 154*a-n* comprises a position sensor such as displacement sensor, the sensor can detect a direction and a magnitude of displacement caused the by operator beginning to walk or otherwise move within the bi-pedal locomotion zone 106. The control unit 152 can receive information regarding the displacement of the sensor. Based on this information, the control unit 152 can send instructions to one or more of the actuators 158*a*, 158*b*, 159*a*, 159*b* to actuate one or more of the rollers 18, 19 such that the walk-about platform 104 moves in the same direction and speed as the operator. For example, the control unit 152 can direct the actuators 158*a*, 158*b*, 159*a*, 159*b* to move the walk-about platform 104 in such a manner as to continually attempt to zero out the displacement sensed by the sensor 154.

In another example where the one or more sensors 154 comprises an optical or ultrasonic sensor, the sensor 154 can detect the position, orientation, and movement of the legs and/or feet of the operator as the operator begins to walk or otherwise move within the bi-pedal locomotion zone 106. The control unit 152 can receive information from the sensor 154 regarding the position, orientation, and movement of the legs and/or feet of the operator. Based on this information the control unit 152 can send instructions to one or more of the actuators 158*a*, 158*b*, 159*a*, 159*b* to actuate one or more of the rollers 18, 19 such that the walk-about platform 104 moves in the same direction and speed as the operator. For example, the control unit 152 can direct the actuators 158*a*, 158*b*, 159*a*, 159*b* to move the walk-about platform 104 in such as manner as to continually maintain the legs and/or feet of the operator within the bi-pedal locomotion zone 106 as the operator moves about the ground surface.

In another example, the operator can control the movement of the walk-about platform 104 directly via one or more of the inputs 156. For example, the operator can use a mobile device 131 to send control instructions to the control unit 152 via a wired or wireless input 156 of the user input interface 151. Based on the input received at the control unit 152, the control unit 152 can send control instructions to the actuators 158*a*, 158*b*, 159*a*, 159*b* to move the walk-about platform 104 in accordance with the input provided by the operator. The operator can similarly manually control the movement of the walk-about platform via another input device such as via a joystick, keyboard, or the like.

Figure 8A:
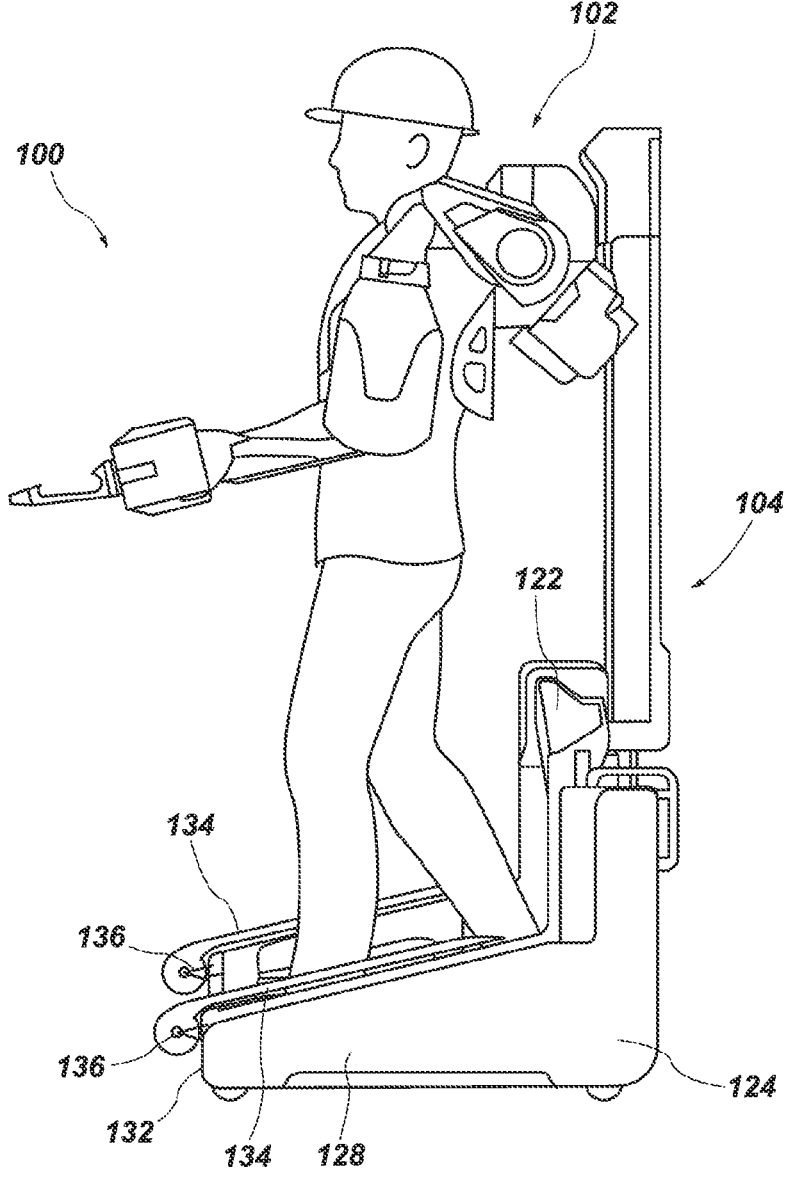
FIG. 8A and FIG. 8B show side views of a walk-about exoskeleton system having deployable forks according to one example of the present disclosure.
Figure 8B:
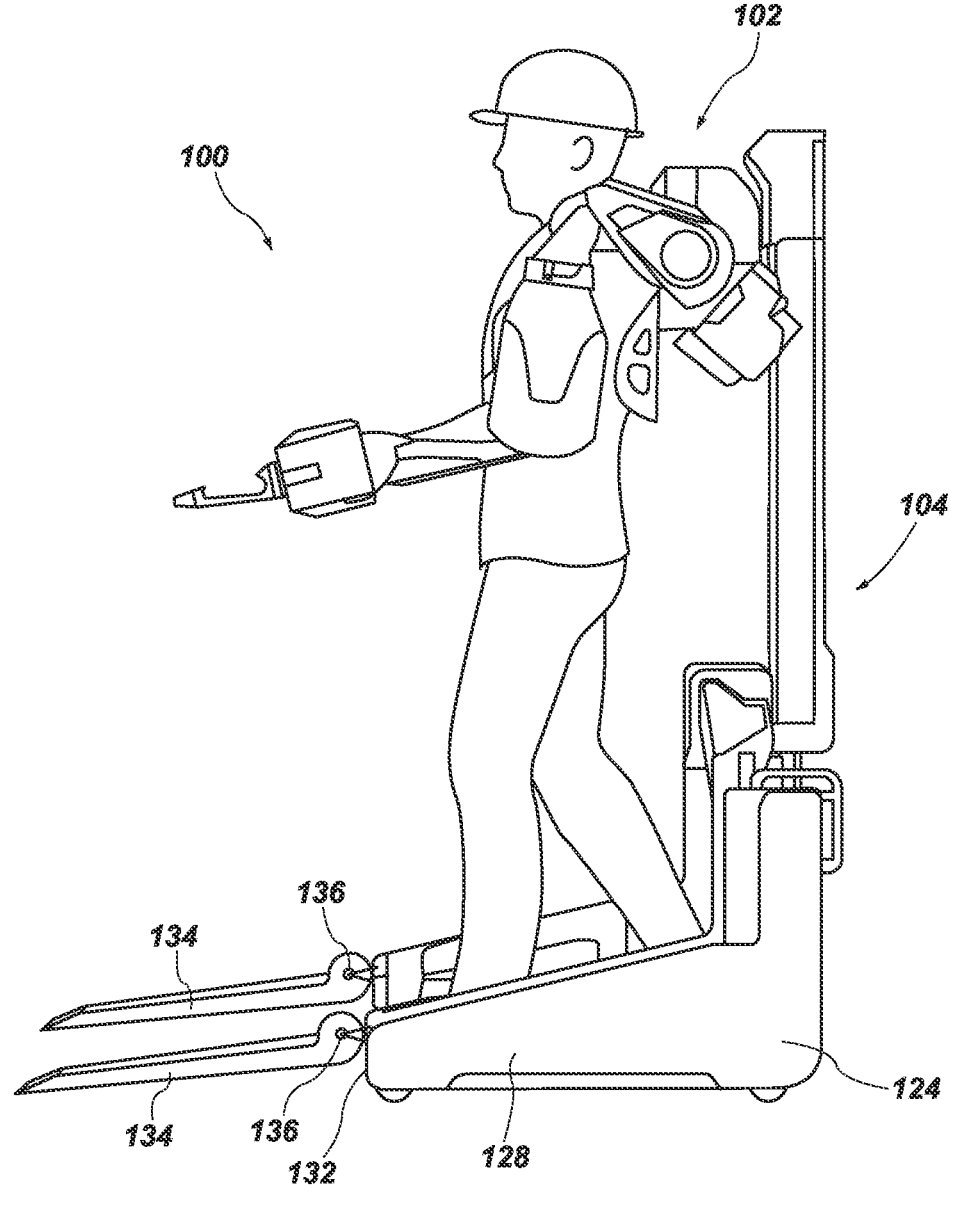
Figure 8C:
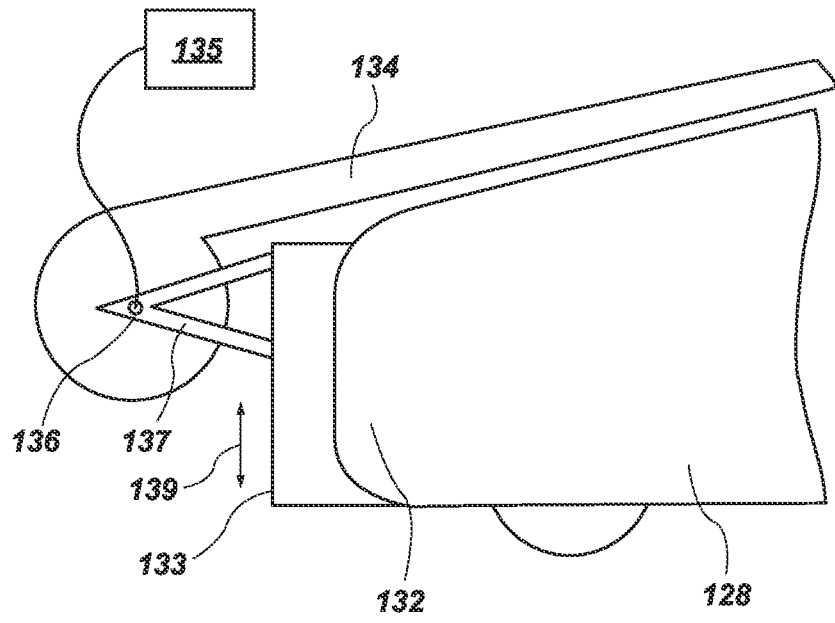
FIG. 8C shows an enlarged view of a front of a lateral member of the walk-about exoskeleton system shown in FIGS. 8A and 8B.

In some examples, a walk-about exoskeleton system can be used to transport pallets in addition to amplifying the work of a human via an exoskeleton. FIGS. 8A and 8B show side views of a walk-about exoskeleton system having deployable forks, and FIG. 8C shows an enlarged view of a front of a lateral member of the walk-about exoskeleton system shown in FIGS. 8A and 8B. Referring to FIGS. 8A-8C, the walk-about platform 104 can comprise lateral members 124 spaced apart by a support bridge 122 as mentioned above. Each of the lateral members 124 can comprise horizontal portions 128. Deployable forks 134 can be configured to attach to the front 332 of the horizontal portion 128 of each of the lateral members 124. The forks 134 can be rotatably attached to the lateral members 124 in any suitable manner. In the example shown, the forks 134 can be attached to the front 132 of the lateral member members 124 via respective axles 136. The forks 134 can be configured to rotate about the axle 136 to rotate from a stowed position (as shown in FIG. 8A) to a deployed position (as shown in FIG. 8B).

In some examples, the deployment and retraction of the forks 134 can be powered by actuators 135. For example, the actuators 135 can comprise electric motors and optionally transmissions coupled to each fork 134, respectively. The actuators 135 can provide a torque sufficient to rotate the forks 134 from the stowed position (FIG. 8A) to a deployed position (FIG. 8B) and from the deployed position to the stowed position. In other examples, the forks 134 can be rotated manually by the operator from the stowed position to the deployed position and back.

With the forks 134 in the deployed position as shown in FIG. 8B, the walk-about exoskeleton system can be used to pick up and transport pallets via the forks 134. For example, the forks 134 can be mounted to the front side 132 of the lateral members 124 via a mount 137. The mount 137 can be configured to extend from an actuator 133. The actuator 133 can be any suitable actuator such as a linear actuator operable to move the mount 137 vertically, indicated by arrow 139. By lowering the mount 137 with the actuator 133 while the forks 134 are in the deployed position, the forks 134 can be moved to a position to pick up a pallet on a ground surface. When the forks 134 are under a pallet, the actuator 133 can raise the mounts 137, thereby raising the forks 134 to lift the pallet to be transported to another location. Optionally, the actuator 135 can be configured to rotate the forks 134 while carrying a pallet such that the forks are angled to maintain the pallet on the forks 134 during transport.

Figure 9A:
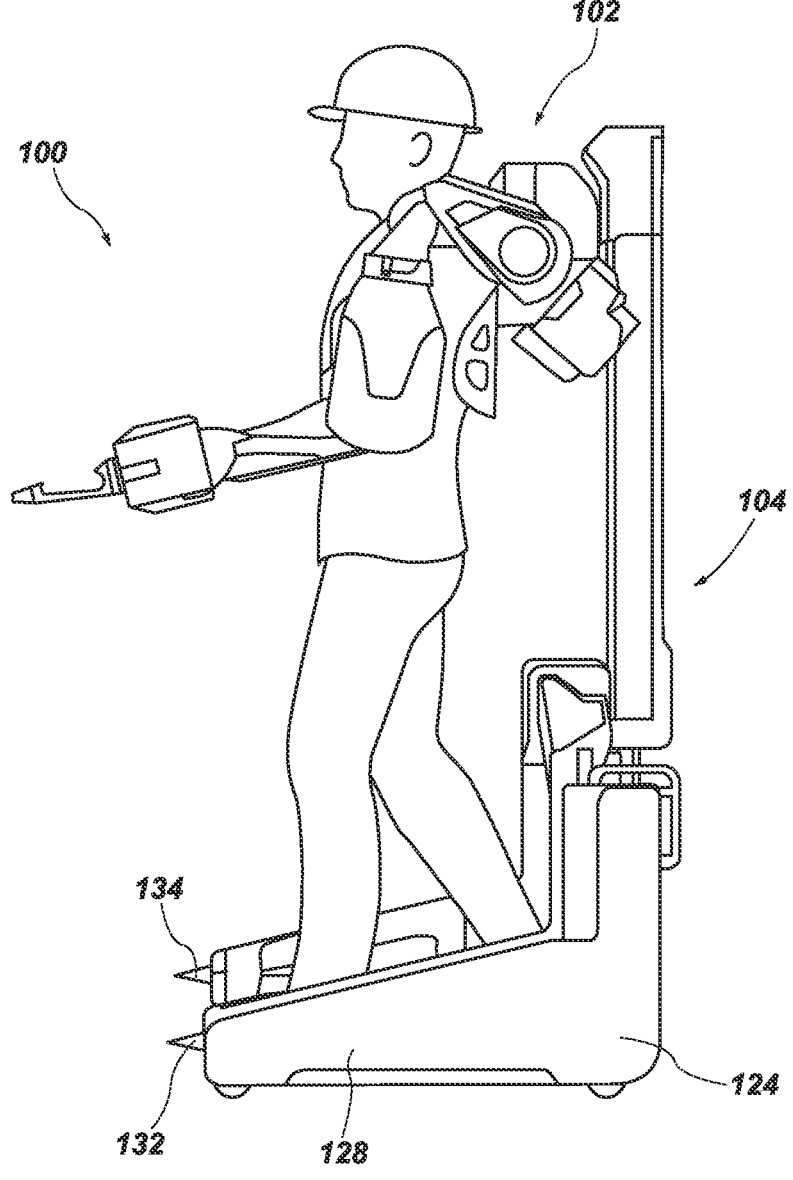
FIG. 9A and FIG. 9B show side views of a walk-about exoskeleton system having deployable forks according to one example of the present disclosure.
Figure 9B:
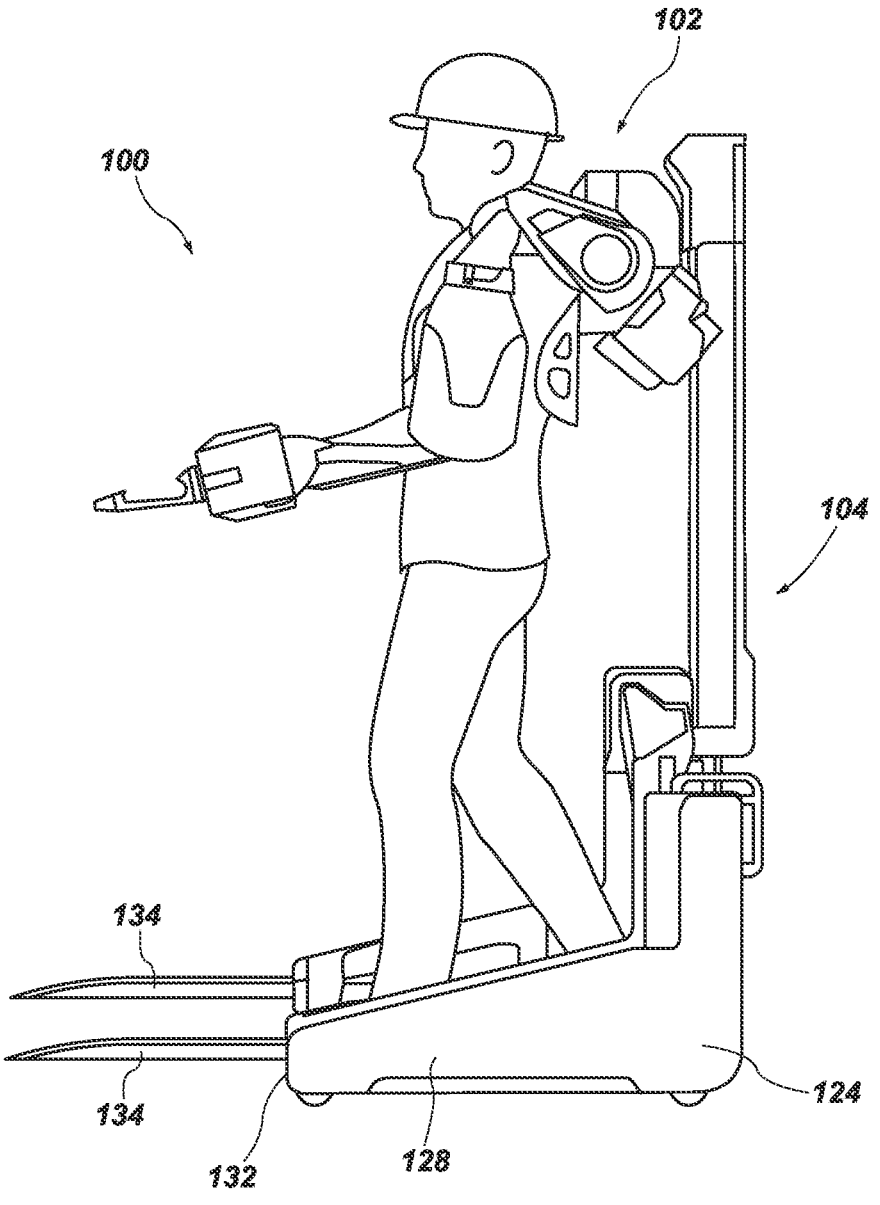
Figure 9C:
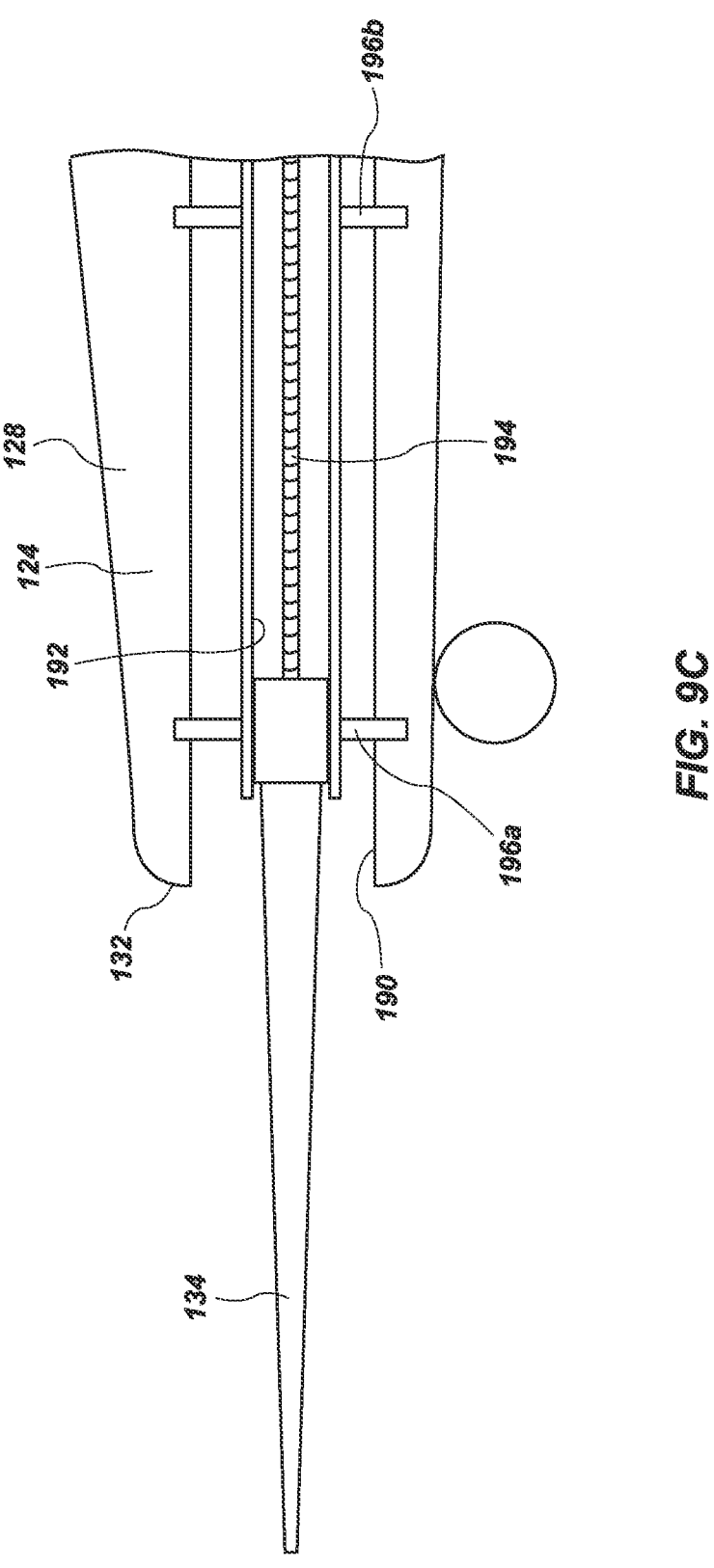
FIG. 9C shows an enlarged view of a front of a lateral member of the walk-about exoskeleton system shown in FIGS. 9A and 9B.

The deployable forks are not limited to rotatable forks as shown in FIGS. 8A and 8B. FIGS. 9A and 9B show side views of a walk-about exoskeleton system also having deployable forks, and FIG. 9C shows an enlarged view of a front of a lateral member of the walk-about exoskeleton system shown in FIGS. 9A and 9B. Referring to FIGS. 9A-9C, the deployable forks 134 can be configured to be housed within or alongside the horizontal portion 128 of each of the lateral members 124 when in the stowed position as shown in FIG. 9A. For example, the forks 134 can be stowed within a fork compartment 190 of the lateral member 124. The forks 134 can be operable to extend from and retract into the lateral members 124 via any suitable mechanism. In the example shown in FIGS. 9A-9C, the forks 134 can be attached to a linear track 192 such that the forks 134 can translate out of the horizontal portions 128 of the lateral members 124 to the deployed position as shown in FIG. 9B.

In some examples, the deployment and retraction of the forks 134 can be done manually by the operator. In other examples, the deployment and retraction of the forks 134 can be powered by an actuator 194 such as a mechanical, hydraulic, or pneumatic linear actuator. In order to raise and lower the forks to pick up and put down pallets, the track 192 and the forks 134 can be raised and lowered vertically via one or more actuators 196*a*, 196*b*. Thus, with the forks 134 in the deployed position as shown in FIG. 9B, the walk-about exoskeleton system can be used to pick up and transport pallets via the forks 134.

Figure 10:
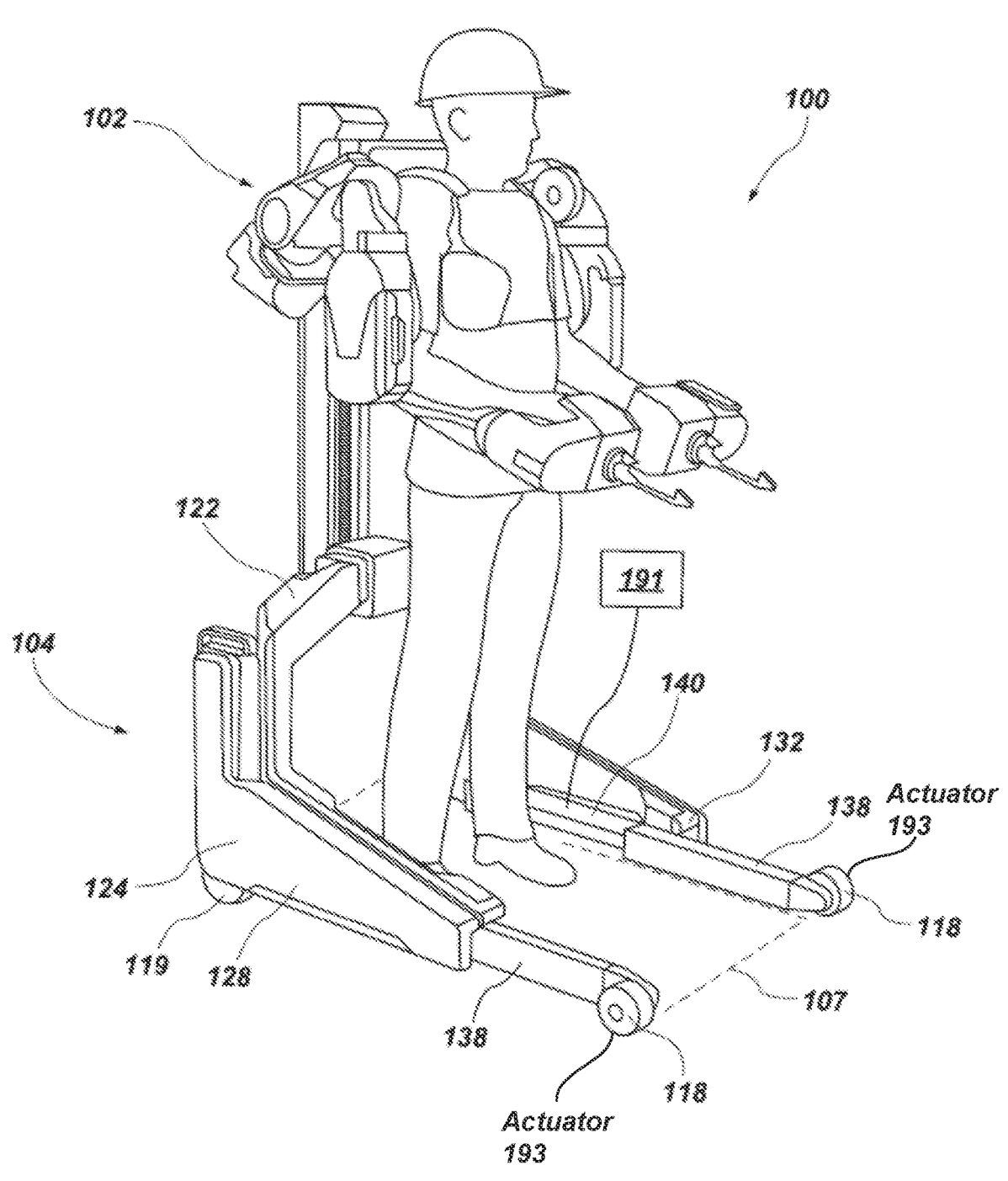
FIG. 10 is an isometric view of a walk-about exoskeleton system having retractable extensions according to one example of the present disclosure.

Referring now to FIG. 10, FIG. 10 is an isometric view of a walk-about exoskeleton system having retractable extensions. In this example, the lateral members 124 of the walk-about base 104 can comprise horizontal portions 128 that can house retractable extensions 138. The retractable extensions 138 can be operable to be stowed within the horizontal portions 128 of the lateral members 124 and to extend outwards from a front side 532 of the lateral members 124, similar to the forks 134 discussed above with reference to FIGS. 9A-9C.

For example, the retractable extensions 138 can be mounted on respective tracks 140 on which the retractable extensions 138 can translate in and out of the horizontal portions 128 of the lateral members 124. In some examples, the retractable extensions 138 can be configured to extend and retract in a powered manner. For example, a linear actuator 191 can be provided and can be operable to extend the retractable extensions 138 out of the lateral members 124 and to retract the retractable extensions 138 back into the lateral members 124. In another example, the front ground contacting rollers 118 can each include an actuator 193 that can be operable to extend the retractable extensions 138 out of the lateral members 124 and to retract the retractable extensions 138 back into the lateral members 124. In implementations in which the actuators are included in the front ground contacting rollers, the actuators for the retractable extensions may be be omitted from the walk-about base, which can save space, reduce cost, and allow increased design flexibility (e.g., with regard to weight distribution, configuration, and so forth). A locking mechanism can be implemented that locks the retractable extensions 138 in a retracted position and in an extended position. The locking mechanism can operate to lock the retractable extensions 138 in a retracted position relative to the lateral members 124, such that actuation of the front ground contacting rollers 118 does not cause the retractable extensions to extend, but still facilitates locomotion of the walk-about platform 104. Likewise, the locking mechanism can operate to lock the retractable extensions 138 in an extended position relative to the lateral members 124, such that continued actuation of the front ground contacting rollers 118 does not cause the retractable extensions to retract, but still facilitates locomotion of the walk-about platform 104. The locking mechanism can comprise a manual lock, such as a pin that extends through a through hole extending through the lateral members 124 and the retractable extensions 138. In another example, the locking mechanism can comprise an actuatable locking mechanism, wherein an actuator (e.g., a linear actuator, such as a solenoid) associated with a locking member (e.g., a latch, a pin, and others) can be selectively controlled to actuate the locking member. There are numerous types and ways in which to implement a locking mechanism as will be recognized by those skilled in the art.

In this example, the front rollers 118, which can be omnidirectional wheels, can be disposed on ends of the retractable extensions 138. Thus, when the retractable extensions 138 are moved outward to the deployed position, the front rollers 118 move outward along with the retractable extension 138. When the front rollers 118 move outward, the possibility of the walk-about exoskeleton system 100 tipping can be prevented by increasing an area within the supports (i.e., within the rollers 118 and 119).

For example, if a load is carried by the exoskeleton 102 in front of the operator, and if the load extends sufficiently forward of the front rollers 118 when the retractable extensions 138 are in the stowed or retracted position, the risk of the walk-about exoskeleton system 100 tipping may increase. This is because the load carried by the exoskeleton 102 can cause the center of gravity of the walk-about exoskeleton system 100 to move forward of the front roller 118 when in the stowed position. The risk of tipping can be prevented by extending the retractable extensions 138 such that the front rollers 118 move forward to a position forward of or underneath the load (or at least to approach a position underneath the load) such that a center of gravity of the walk-about exoskeleton system 100 with the load remains within an area defined by the front rollers 118 in the extended position and the rear rollers 119 (that is, center of gravity remains within an extended bi-pedal locomotion zone 107 shown in FIG. 10 defined by the front rollers 118, the rear rollers 119, the lateral members 124 including the retractable extensions 138, and the support bridge 122). Because the center of gravity remains within an area defined by the front rollers 118 and the rear rollers, the walk-about exoskeleton system 100 can be prevented from tipping.

In some examples, the retractable extensions 138 can be extended automatically based on a load carried by the exoskeleton 102. The retractable extensions 138 can be actuated based on control instructions received from a control unit on the walk-about exoskeleton system 100 (e.g., the control unit 172, 160, 152 discussed herein or a separate control unit). The control unit can receive information regarding a torque caused by a load carried by the exoskeleton 102 (e.g., a torque acting on the exoskeleton system based on the position of the limbs of the exoskeleton 102 and the weight of the load carried by the exoskeleton 102). If the torque is determined to potentially cause the walk-about exoskeleton system 100 to tip, the control unit can cause the retractable extensions 138 to extend outwards, thus moving the front rollers 118 in a forward direction to prevent tipping. In some examples, the retractable extensions 138 can be operable to extends outwards to a furthermost position. In some examples, the retractable extensions 138 can be operable to extend partially outwards based on the position of limbs the exoskeleton 102 and the weight of the load carried by the exoskeleton 102.

Figure 11:
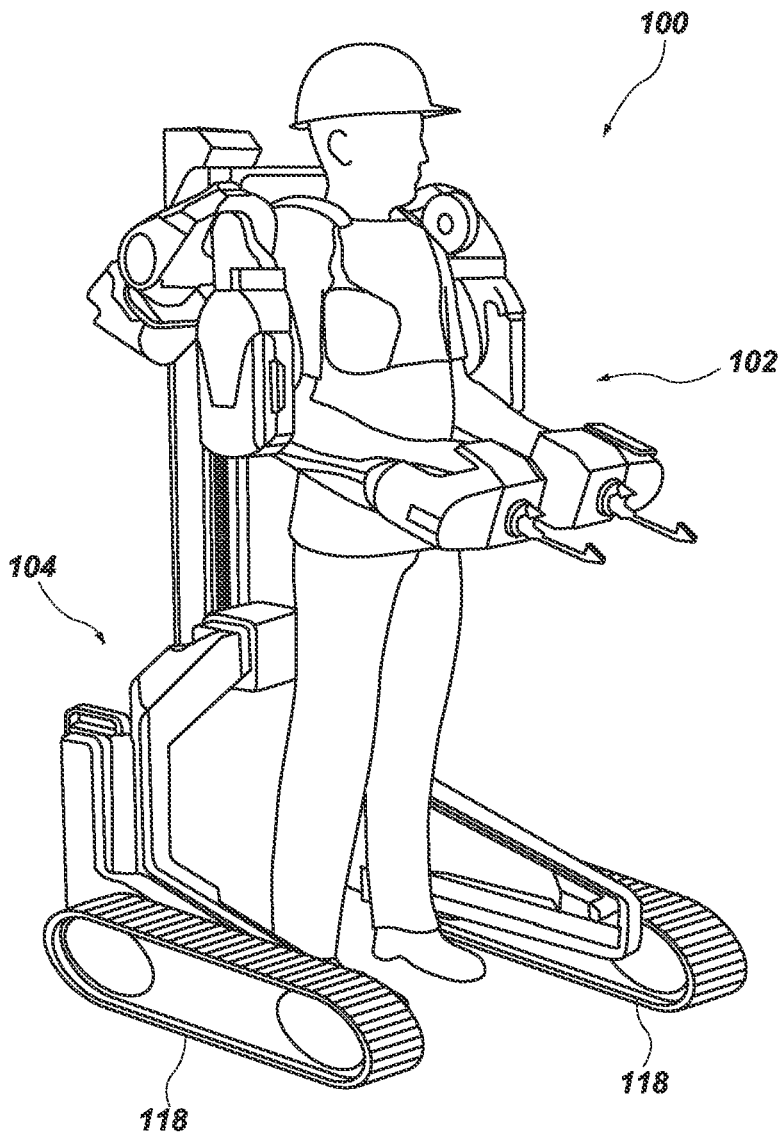
FIG. 11 is an isometric view of a walk-about exoskeleton system having track rollers according to one example of the present disclosure.

Referring now to FIG. 11, FIG. 11 is an isometric view of a walk-about exoskeleton system having track rollers. In this example, and as mentioned above, the rollers 118 of a walk-about exoskeleton can comprise wheels or tracks. In this example shown in FIG. 11, the rollers 118 are shown as tracks. In some examples, the tracks can comprise omnidirectional tracks. The examples of the rollers herein are not intended to be limiting in any way. It should be understood that any suitable roller can be utilized to facilitate movement of the walk-about exoskeleton system 100 about a ground surface.

In some instances, an operator may desire to travel using a walk-about exoskeleton system without walking. Thus, in some examples, the walk-about exoskeleton system 100 can be configured to switch between a walking configuration and a riding configuration. FIGS. 12-15 show a walk-about exoskeleton system having a deployable riding platform. Referring to FIGS. 12-15, during use of the walk-about exoskeleton system 100, the operator may desire to ride on the system 100 instead of walking with the system 100. To facilitate this, the walk-about platform 104 can comprise a riding platform attached to the walk-about platform. The riding platform can be selectively moveable into the bi-pedal locomotion zone 106 to allow the operator to ride on the walk-about platform 104. In this example, the riding platform can comprise a right foot platform 142a connected to a right lateral member 124a and a left foot platform 142b connected to a left lateral member 124b. Thus, in this example, the walk-about platform 104 can be considered a convertible ride-on and walk-about platform.

Each of the foot platforms 142a, 142b are operable to selectively move into and out of the bi-pedal locomotion zone 106 such that the operator can selectively ride on or walk with the walk-about exoskeleton system 100. In this example, the right and left foot platforms 142a, 142b are rotatably attached to the right and left lateral members 124a, 124b, respectively. The right and left foot platforms 142a, 142b can connect to an outside edge of the horizontal portion 128 of each of the right and left lateral members 124a, 124b. The right and left foot platforms 142a, 142b can rotate about an axle 146 that runs along the outside edge of the horizontal portion 128 of each of the right and left lateral members 124a, 124b. Each of the right and left foot platforms 142a, 142b can comprise a friction enhancing surface 144 to increase safety such that the operator can be prevented from slipping off of the right and left foot platforms 142a, 142b.

Figures 12, 13:
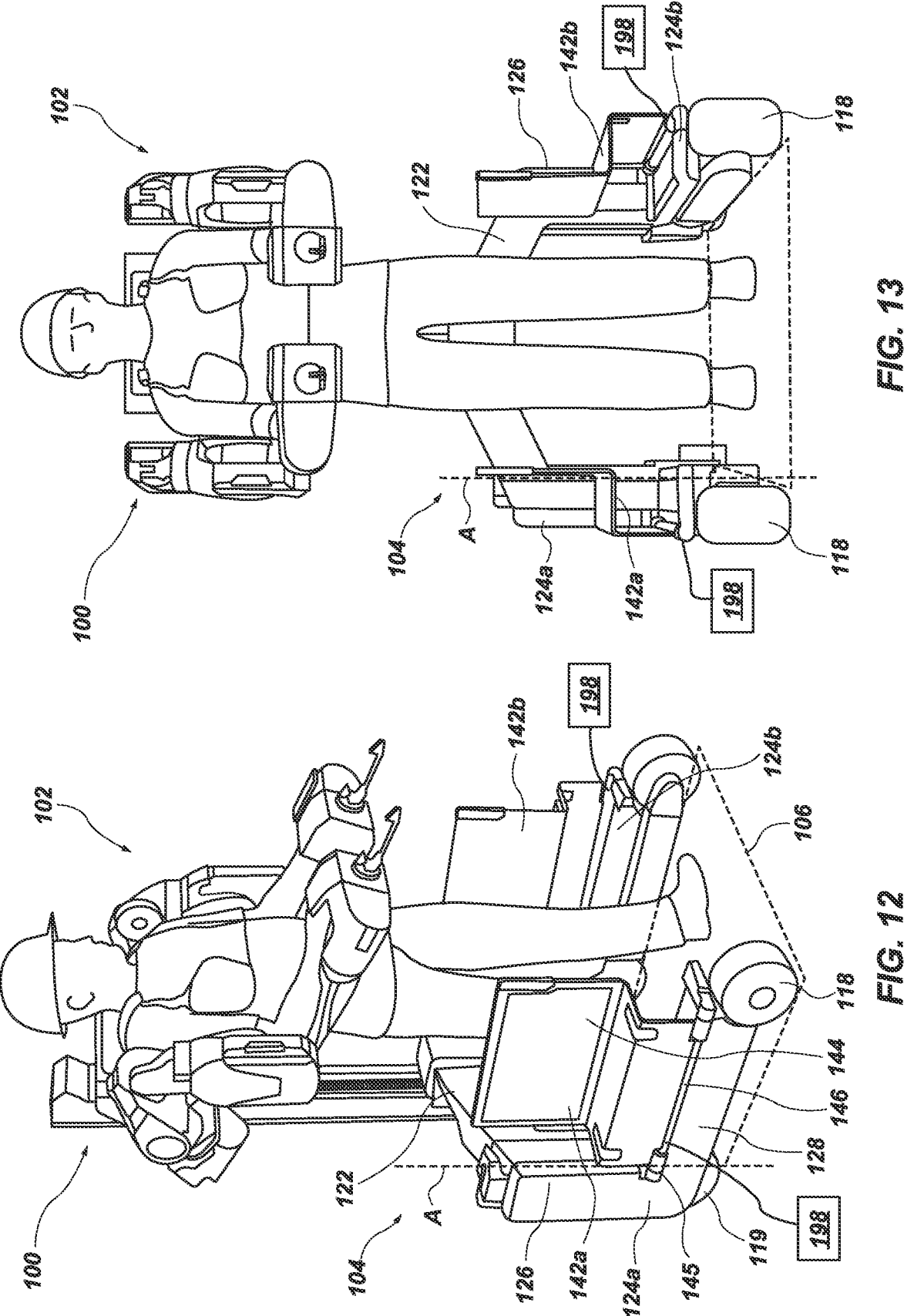
FIG. 12 is an isometric view of a walk-about exoskeleton system having a deployable riding surface according to one example of the present disclosure.
FIG. 13 is a front view of the walk-about exoskeleton system shown in FIG. 12.

As shown in FIGS. 12 and 13, the right and left foot platforms 142a, 142b can be rotated to walking position where the right and left foot platforms 142a, 142b are rotated up and away from the bi-pedal locomotion zone such that a plane defined by the friction enhancing surface 144 is parallel with an axis A defined by the vertical portions 126 of the left and right lateral members 124*a*, 124*b*. With the right and left foot platforms 142*a*, 142*b* in the walking position, the operator can walk in the bi-pedal locomotion zone 106 with the walk-about exoskeleton system 100 as described above.

Figures 14, 15:
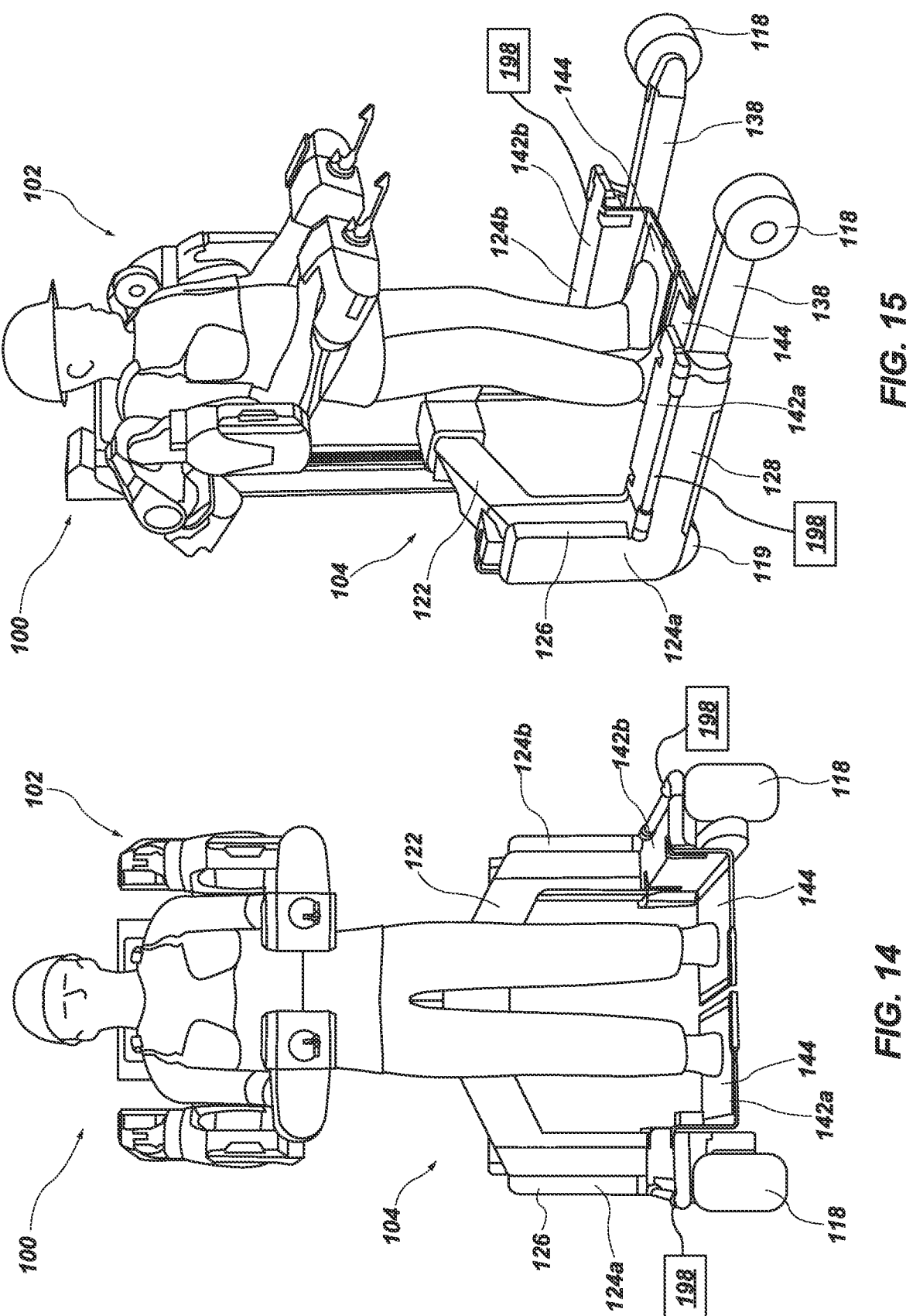
FIG. 14 is a front view of the walk-about exoskeleton system shown in FIG. 12 with the riding surface in a deployed position.
FIG. 15 is an isometric view of the walk-about exoskeleton system shown in FIG. 12 with retractable extensions.

As shown in FIGS. 14 and 15, the right and left foot platforms 142*a*, 142*b* can be rotated to a riding position wherein the right and left foot platforms 142*a*, 142*b* are rotated down into the bi-pedal locomotion zone such that a plane defined by the friction enhancing surface 144 is parallel with a ground surface. With the right and left foot platforms 142*a*, 142*b* in the riding position, the operator can ride on the walk-about platform 104 while donning the exoskeleton 102 of the walk-about exoskeleton system 100. The operator can control the walk-about platform 104 via a user input such as one of the user input devices 156*a-n* described above with reference to FIG. 7.

In one example, the right and left foot platforms 142*a*, 142*b* can each be rotatably connected to the right and left lateral member 124*a*, 124 via a bi-stable mechanism. The bi-stable mechanism can be operable such that the right and left foot platforms 142*a*, 142*b* are biased to remain out of the bi-pedal locomotion zone 106 when the right and left foot platforms 142*a*, 142*b* are in the walking position and are biased to remain in the bi-pedal locomotion zone 106 when the right and left foot platforms 142*a*, 142*b* are in the riding position. For example, the right and left foot platforms 142*a*, 142*b* can connect to the right and left lateral members 124*a*, 124*b* via a torsion spring 145. The torsion spring 145 can be configured to have a stiffness such that when the right and left foot platforms 142*a*, 142*b* are in the upright walking position, the torsion spring 145 can maintain the right and left foot platforms 142*a*, 142*b* in the upright walking position. The torsion spring 145 can be further configured with a stiffness such that when the right and left foot platforms 142*a*, 142*b* are down in the riding position, the spring force of the torsion spring 145 is insufficient to overcome a torque caused gravity acting on the right and left foot platforms 142*a*, 142*b* such that the right and left foot platforms 142*a*, 142*b* remain in the riding position.

In some examples, the operator can manually move the right and left foot platforms 142*a*, 142*b* from the walking position to the riding position and from the riding position to the walking position. In other examples, an actuator 198 such as an electric motor can be provided with each of the right and left foot platforms 142*a*, 142*b* to move the right and left foot platforms 142*a*, 142*b* from the walking position to the riding position and from the riding position to the walking position.

As shown in FIG. 15, the walk-about exoskeleton 100 can also comprise retractable extensions 138 as discussed above with reference to FIGS. 9A-9C and 10. Of course, it is noted that any of the features of the exoskeleton system 100 discussed herein can be incorporated in any suitable combination and the examples provided herein are not intended to be limiting in any way.

Figures 16, 17:
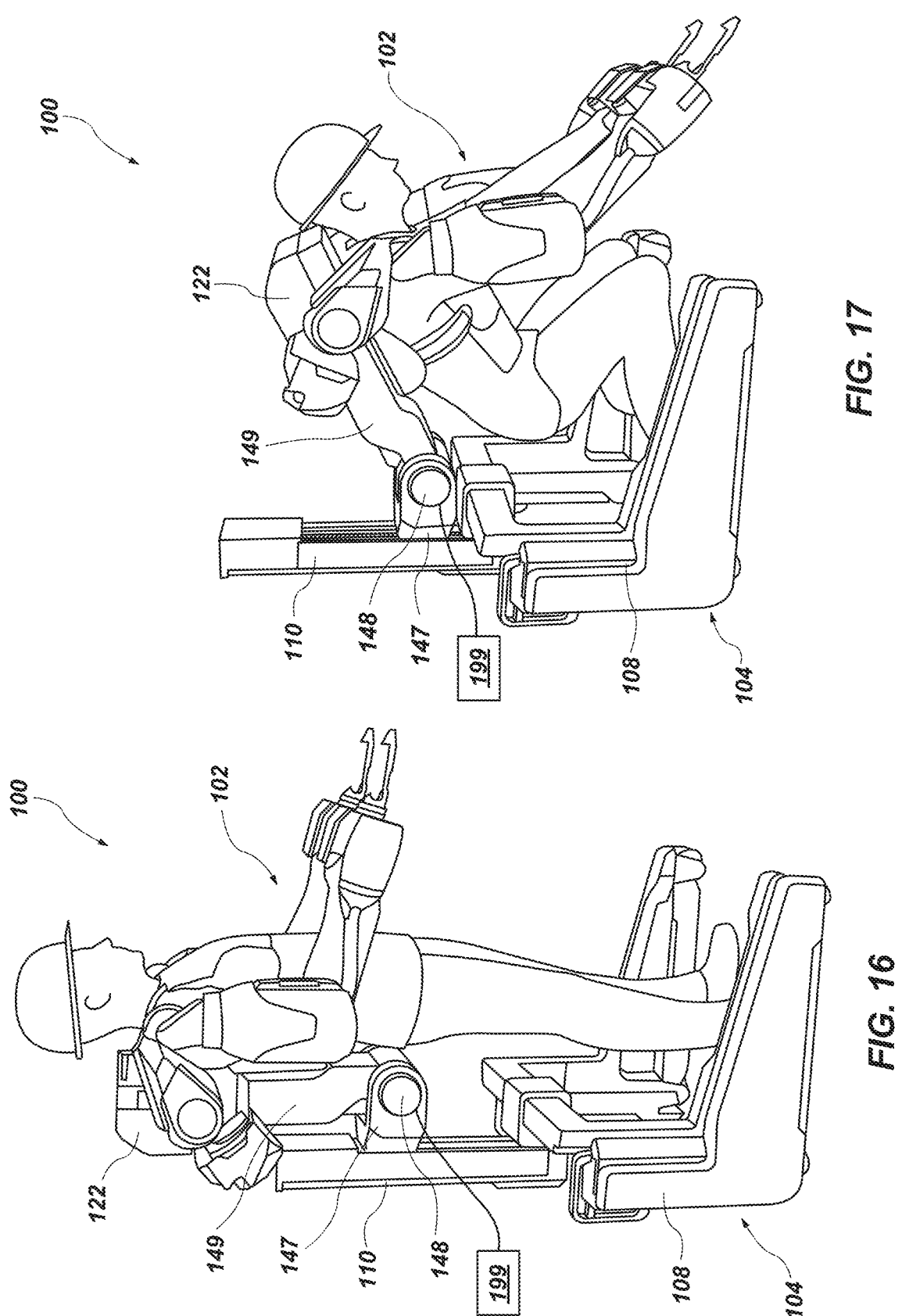
FIG. 16 is a side view of a walk-about exoskeleton system having a torso-forebend.
FIG. 17 is a side view of the walk-about exoskeleton system shown in FIG. 16 with the operator in a crouched position.
Figure 18:
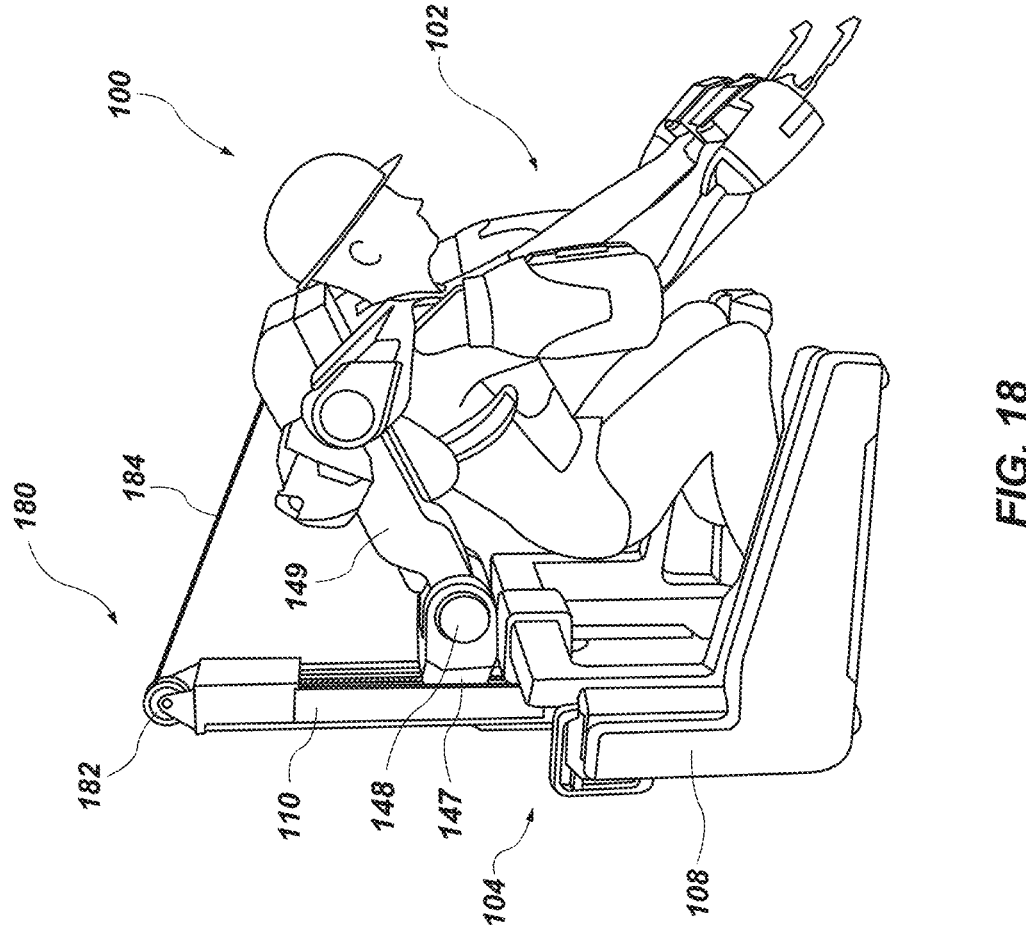
FIG. 18 is a side view of a walk-about exoskeleton system with a torso-forebend supported by a winch system.

Referring now to FIGS. 16-18, FIGS. 16-18 show a walk-about exoskeleton system having a torso-forebend. When an operator desires to pick something up that is on a ground surface in front of the walk-about exoskeleton system 100, the operator may naturally want to lean forward over the item to be picked up. Accordingly, the walk-about base 104 of the walk-about exoskeleton system 100 can comprise a torso member 149 and a mast interface member 147 that rotate relative to one another. In some examples, the torso member 149 can be attached to the support bridge 122 of the exoskeleton 102 shown in FIGS. 1-4. In other examples, the torso member 149 can be formed integrally with the support bridge 122 of the exoskeleton 102. In this example, the torso member 149 and the mast interface member 147 can be joined at a joint 148. The torso member 149 and mast interface member 147 can rotate about an axis of rotation at the joint 148 to allow for a torso-forebend motion. That is, when the operator leans forward, such as shown in FIG. 17, the torso member 149 rotates relative to the mast interface member 147 to remain substantially parallel with the operator's torso.

The rotation between the torso member 149 and the mast interface member 147 can be a powered rotation. For example, an actuator 199 can be provided between the torso member 149 and the mast interface member 147 to rotate the torso member 149 relative to the mast interface member 147 about the axis of rotation at the joint 848. The actuator 199 can comprise an electric motor and a transmission, though any other suitable actuator could also be used. In the example shown in FIG. 18, a winch system 180 can be provided to facilitate the rotation between the torso member 149 and the mast interface member 149. The winch system 180 can comprise a winch 182 that can be disposed on the mast 110. The winch system 180 can further comprise a cable 184 can connect the torso member 149 and exoskeleton 102 to the winch 182 such that the winch 182 can raise and lower the torso member 149 causing the torso member 149 to rotate about the axis at the joint 848.

The mast interface member 147 can be operable to move vertically along the mast 110 in a similar manner as the exoskeleton 102 can moves vertically along the mast 110 as described above with reference to FIGS. 1-5. Thus, the operator can perform a squatting motion and lean forward with torso-forebend while using the walk-about exoskeleton system 100.

It should be noted that while various examples of a walk-about exoskeleton system are described above, the examples are illustrative of different features that can be incorporated in a walk-about exoskeleton system. Thus, the features in each of the walk-about exoskeleton systems described above can be combined together in any combination desired.

Figures 19A, 19B:
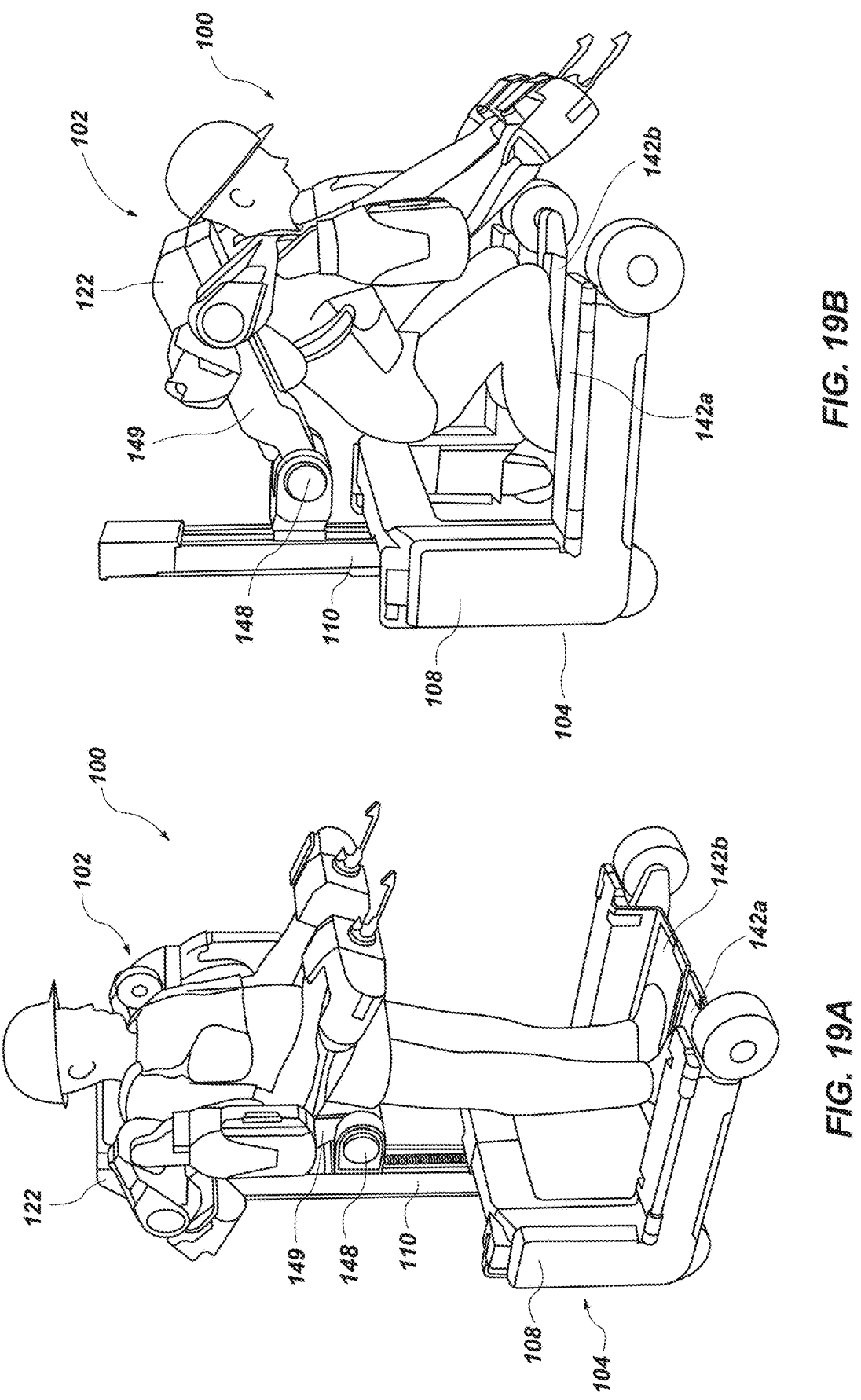
FIGS. 19A and 19B show the walk-about exoskeleton with a torso-forebend and a riding surface or platform.

As an example, FIGS. 19A and B show the walk-about exoskeleton system 100 incorporating torso-forebend with the torso member 149 and a mast interface member 147 that rotate relative to one another to provide torso-forebend as described above. Further, the walk-about exoskeleton system 100 can also comprise the riding platform that can be selectively moveable into a bi-pedal locomotion zone to allow the operator to ride on the walk-about platform 104. As explained above, a riding platform can comprise a right foot platform 142*a* and a left foot platform 142*b* on which an operator can stand to ride on the walk-about platform 104. This is just another example of a combination of features of the walk-about exoskeleton system and the features described herein can be combined in any desired configuration.

In some implementations, the walk-about exoskeleton system 100 or the conveyance system 150 of the walk-about exoskeleton can be operably integrated (e.g., in operable communication) with a remote navigation system 195 in a work environment, such as an in-building navigation system, comprising one or more robotic assets of a different type (e.g., existing robotic assets that perform various automated tasks, such as those within a warehouse) than the walk-about exoskeleton system 100 that move within an environment. For example, the remote navigation system

195 can comprise robotic assets whose movements are based on in-floor guidance, (e.g., using radio frequency (RF) signals from an in-floor wire), magnetic tape guidance, laser-based guidance, gyroscopic (e.g., inertial) guidance, camera-based visual guidance, and so forth.

The walk-about exoskeleton system 100 can be operably integrated with the remote navigation system 195 and operated in conjunction with the other robotic assets. The walk-about exoskeleton system 100 can be operated in a variety of modes, including for example, a live-operator mode, a remote (e.g., tele-operation) mode, or an autonomous mode. The live-operator mode is a mode in which the operator is present in the exoskeleton 102 in either a walking mode or a riding mode, as described herein. The remote mode is a mode in which the operator controls the exoskeleton system 100 (e.g., controls at least in part) remotely with the remote navigation system 195 using a remote device, such as a mobile phone 131, a joystick, a keyboard, or the like, as described herein.

The autonomous mode is a mode in which the operator may not be necessary to control the walk-about exoskeleton system 100. For example, the operator may only monitor the walk-about exoskeleton system 100 in case an intervention is necessary. In other cases, the operator may have no interaction with the walk-about exoskeleton system 100. The walk-about exoskeleton system 100 can also include a controller for switching between the modes (e.g., the interface can include an input system that allows an operator and/or the remote navigation system 195 to switch between modes). In some implementations, the modes can be hot-switched, in other words, the walk-about exoskeleton system 100 can switch, or be switched, between modes in real time, without having to return to a predefined starting point, such as a base station or charging station.

In integrated implementations, the walk-about exoskeleton system 100 can include an interface 197 that can connect the walk-about exoskeleton 100 to the remote navigation system 195. The remote navigation system 195 can enable the walk-about exoskeleton system 100 to be in operable communication with the remote navigation system 195. For example, the interface 197 can be an interface that enables electronic communication between the remote navigation system 195 and the walk-about exoskeleton system 100 (e.g., one or more of log-in communication, status communication, and operational control communication). In some cases, the interface 197 may be associated with or integrated with one or both of the user interface input 151 or the control unit 152. The walk-about exoskeleton system 100 can also include one or more sensors that enable integration, such as sensors that can detect the RF signals, magnetic sensors, lasers and laser-detection mechanisms, a gyroscope system, cameras (e.g., image capture devices in various spectra, such as visible, infra-red, and so forth).

In some cases, the interface 197 can allow the walk-about exoskeleton system 100 to provide various parameters to the remote navigation system 195 and to receive various commands from the remote navigation system 195. For example, the walk-about exoskeleton system 100 can provide parameters such as maximum and minimum speed, turning radius, weight (e.g., mass), and footprint (e.g., how much space the walk-about exoskeleton system 100 occupies, which can include one or both of floor area and volume). Further, the walk-about exoskeleton system 100 can provide information from its various sensors to the remote navigation system 195.

The remote navigation system 195 can then send commands to the walk-about exoskeleton system 100 that control one or more aspects of the walk-about exoskeleton system 100, such as the conveyance system 150, to facilitate movement of the walk-about platform 104 about the ground surface (e.g., the floor of the work environment). Further, the remote navigation system 195 can also send commands to control one or more systems or subsystems of the walk-about exoskeleton system 100 described in this document, including (but not limited to) the power source 120, the mast exoskeleton interface system 171, the extendible arm 162 of the moveable counterweight system 161, the retractable extensions 138 for the forward rollers 118 (e.g., via either or both of the actuators 191 and 193), the torso-forebend, the winch system 180, the limb members 114, the joints 115, the forks 134, and so forth.

In some implementations, the walk-about exoskeleton system 100 as integrated with the remote navigation system 195 can also include a training mode. The training mode can allow an operator to perform tasks while the walk-about exoskeleton system 100 is in a learning mode so that the walk-about exoskeleton system 100 can perform those tasks in the autonomous mode.

The benefits of integration with a remote navigation system 195 can include route-optimization, collision-avoidance with existing robotic assets already part of the navigation system 195, and increased speed. These advantages may be greater in modes without an operator (e.g., remote or autonomous), but even in the live-operator or remote mode, route-optimization collision-avoidance can be improved, and speed may be increased when the walk-about exoskeleton system 100 is operated in a riding configuration (e.g., as described with reference to FIGS. 12-15). Further, the autonomous mode may also allow the operator to perform other functions, rather than operating the exoskeleton system 100.

The following examples are further illustrative of several embodiments of the present technology:

1. A walk-about exoskeleton system, comprising
   an exoskeleton; and
   a walk-about platform in support of the exoskeleton, the walk-about platform being maneuverable about a ground surface, and comprising:
   a conveyance system operable with the walk-about platform, the conveyance system being operable to facilitate movement of the walk-about platform about the ground surface;
   a bi-pedal locomotion zone defined, at least in part, by the walk-about platform that provides clearance for bi-pedal locomotion of an operator donning the exoskeleton.

2. The walk-about exoskeleton system of example 1, wherein the walk-about platform further comprises:
   a walk-about base; and
   a mast extending up from the walk-about base, wherein the exoskeleton is mounted to the mast so as to position the operator in the bi-pedal locomotion zone upon donning the exoskeleton.

3. The walk-about exoskeleton system of any preceding example, wherein the exoskeleton is coupled to the mast.

4. The walk-about exoskeleton system of any preceding example, wherein the exoskeleton is vertically adjustable along the mast.

5. The walk-about exoskeleton system of any preceding example, wherein the exoskeleton further comprises a torso member and a mast interface member that rotate relative to one another about an axis of rotation at a torso-forebend joint.

6. The walk-about exoskeleton system of any preceding example, wherein the relative rotation of the torso member and the mast interface member about the axis is powered by an actuator.

7. The walk-about exoskeleton system of any preceding example, further comprising a winch system coupled between the mast and the exoskeleton, the winch system being operable to rotate the torso member relative to the mast interface member about the axis of rotation at the torso-forebend joint.

8. The walk-about exoskeleton system of any preceding example, wherein the bi-pedal locomotion zone comprises an area defined by a plurality of ground-contacting rollers of the conveyance system that are disposed on the walk-about base, and wherein a center of gravity of the walk-about exoskeleton system is maintained within the area to avoid tipping during use.

9. The walk-about exoskeleton system of any preceding example, further comprising a power source supported by the walk-about base at a position operable to maintain the center of gravity within the area to avoid tipping during use.

10. The walk-about exoskeleton system of any preceding example, wherein the power source is supported by the walk-about base at a position rearward of the operator.

11. The walk-about exoskeleton system of any preceding example, wherein the walk-about base comprises a support bridge and first and second lateral members extending outward from the support bridge below the exoskeleton, and wherein the first and second lateral members define, at least in part, the bi-pedal locomotion zone.

12. The walk-about exoskeleton system of any preceding example, wherein the first and second lateral members each comprise front and rear wheels.

13. The walk-about exoskeleton system of any preceding example, further comprises a detachable counterweight that is operable to selectively attach to the walk-about base.

14. The walk-about exoskeleton system of any preceding example, wherein the counterweight comprises one or more batteries.

15. The walk-about exoskeleton system of any preceding example, further comprising an extendable arm supported by the walk-about base, the extendable arm being extendable and retractable in a direction away from a direction of the first and second lateral members.

16. The walk-about exoskeleton system of any preceding example, further comprising an actuator operable to facilitate extension and retraction of the extendable arm.

17. The walk-about exoskeleton system of any preceding example, further comprising first and second forks extending from the first and second lateral members, respectively, the first and second forks being actuatable to carry a load.

18. The walk-about exoskeleton system of any preceding example, wherein the first and second forks are operable to move from a stowed position to a deployed position.

19. The walk-about exoskeleton system of any preceding example, wherein the first and second forks are retractable into the first and second lateral members.

20. The walk-about exoskeleton system of any preceding example, wherein the first and second forks are rotatable relative to the first and second lateral members to move from the stowed position to the deployed position.

21. The walk-about exoskeleton system of any preceding example, wherein:

the walk-about base comprises a support bridge and first and second lateral members extending outward from the support bridge below the exoskeleton, and wherein the first and second lateral members define, at least in part, the bi-pedal locomotion zone; and the first and second lateral members each comprise a retractable extension operable to selectively extend and retract from the first and second lateral members, respectively.

22. The walk-about exoskeleton system of any preceding example, wherein the ground-contacting rollers comprise front and rear ground-contacting rollers, the front ground contacting rollers being disposed on the retractable extensions of the first and second lateral members, respectively.

23. The walk-about exoskeleton system of any preceding example, wherein the walk-about base comprises an actuator in each of the first and second lateral members operable to extend and retract the retractable extensions.

24. The walk-about exoskeleton system of any preceding example, wherein the front ground contacting rollers each include an actuator operable to extend and retract the retractable extensions.

25. The walk-about exoskeleton system of any preceding example, wherein the conveyance system is operably integrated with a remote navigation system via an interface that connects the walk-about exoskeleton to the remote navigation system, the remote navigation system configured to facilitate movement of the walk-about platform about the ground surface in at least one of a riding mode, a remote mode, or an autonomous mode.

26. A walk-about platform operable to support a wearable exoskeleton, the walk about platform comprising:

a conveyance system operable to facilitate movement of the walk-about platform about a ground surface;

a bi-pedal locomotion zone defined, at least in part, by the walk-about platform that provides clearance for bi-pedal locomotion of an operator.

27. The walk-about platform of any preceding example, wherein the conveyance system is operably integrated with a remote navigation system via an interface that connects the walk-about exoskeleton to the remote navigation system, the remote navigation system configured to facilitate movement of the walk-about platform about the ground surface in at least one of a riding mode, a remote mode, or an autonomous mode.

28. A walk-about exoskeleton system, comprising an exoskeleton; and a walk-about platform in support of the exoskeleton, the walk-about platform being maneuverable about a ground surface, and comprising:

a conveyance system operable with the walk-about platform, the conveyance system being operably integrated with a remote navigation system via an interface that connects the walk-about exoskeleton to the remote navigation system, the remote navigation system configured to facilitate movement of the walk-about platform about the ground surface in an autonomous mode.

29. The walk-about exoskeleton system of any preceding example, wherein the conveyance system is further configured to facilitate movement of the walk-about platform about the ground surface in at least one of a riding mode or a remote mode.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some examples or features described herein may be combined with other examples or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A walk-about exoskeleton system, comprising:
an upper-body robotic exoskeleton comprising at least one upper-body robotic limb that interacts with an arm of an operator and that facilitates augmented upper-body movements of the operator, the upper-body robotic limb comprising at least one powered joint actuatable in at least one degree of freedom;
a walk-about platform in support of the exoskeleton, the walk-about platform being maneuverable about a ground surface, and comprising:
a conveyance system comprising a ground-contacting element, the conveyance system being operable with the walk-about platform, and to facilitate movement of the walk-about platform about the ground surface;
a walk-about base comprising first and second lateral members and a support bridge supported in an elevated position above the first and second lateral members to define an opening between the support bridge and the ground surface; and
a bi-pedal locomotion zone defined, at least in part, by the walk-about platform that provides clearance for bi-pedal locomotion of an operator donning the exoskeleton, the lower-body of the operator being decoupled from the walk-about platform;
a mast extending up from the walk-about base;
a mast interface member moveably coupled to the mast; and
a torso member supported by the mast interface member, and in support of the exoskeleton; and
an operator interface supported by the torso member, the torso member and the operator interface being operable to rotate relative to the mast interface member about an axis of rotation at a torso-forebend joint,
wherein the bi-pedal locomotion zone extends through the opening, such that the clearance provided for the operator extends at least below the support bridge.

2. The walk-about exoskeleton system of claim 1, wherein the exoskeleton is supported by the mast so as to position the operator in the bi-pedal locomotion zone upon donning the exoskeleton.

3. The walk-about exoskeleton system of claim 1, wherein the exoskeleton is coupled to the mast via the torso interface member and the mast interface member.

4. The walk-about exoskeleton system of claim 1, wherein the exoskeleton is vertically adjustable along the mast.

5. The walk-about exoskeleton system of claim 1, wherein the relative rotation of the torso member and the mast interface member about the axis is powered by an actuator.

6. The walk-about exoskeleton system of claim 1, further comprising a winch system coupled between the mast and the exoskeleton, the winch system being operable to rotate the torso member relative to the mast interface member about the axis of rotation at the torso-forebend joint.

7. The walk-about exoskeleton system of claim 1, wherein the bi-pedal locomotion zone comprises an area defined, at least in part, by a plurality of ground-contacting elements in the form of ground-contacting rollers of the conveyance system that are disposed on the walk-about base, and wherein a center of gravity of the walk-about exoskeleton system is maintained within the area to avoid tipping during use.

8. The walk-about exoskeleton system of claim 7, further comprising a power source supported by the walk-about base at a position operable to maintain the center of gravity within the area to avoid tipping during use.

9. The walk-about exoskeleton system of claim 8, wherein the power source is supported by the walk-about base at a position rearward of the operator.

10. The walk-about exoskeleton system of claim 7, wherein the first and second lateral members define, at least in part, the bi-pedal locomotion zone; and
the first and second lateral members each comprise a retractable extension operable to selectively extend and retract from the first and second lateral members, respectively.

11. The walk-about exoskeleton system of claim 10, wherein the ground-contacting rollers comprise front and rear ground-contacting rollers, the front ground contacting rollers being disposed on the retractable extensions of the first and second lateral members, respectively.

12. The walk-about exoskeleton system of claim 11, wherein the walk-about base comprises an actuator in each of the first and second lateral members operable to extend and retract the retractable extensions.

13. The walk-about exoskeleton system of claim 11, wherein the front ground contacting rollers each include an actuator operable to extend and retract the retractable extensions.

14. The walk-about exoskeleton system of claim 1, wherein the first and second lateral members extend outward from the support bridge below the exoskeleton, and wherein the first and second lateral members define, at least in part, the bi-pedal locomotion zone.

15. The walk-about exoskeleton system of claim 1, wherein the first and second lateral members each comprise front and rear rollers.

16. The walk-about exoskeleton system of claim 1, further comprising a counterweight that is operable with the walk-about base.

17. The walk-about exoskeleton system of claim 16, wherein the counterweight is adjustable so as to vary the center of gravity of the walk-about exoskeleton system.

18. The walk-about exoskeleton system of claim 16, wherein the counterweight comprises an extendable arm supported by the walk-about base, the extendable arm being extendable and retractable in a direction away from a direction of the first and second lateral members.

19. The walk-about exoskeleton system of claim 18, further comprising an actuator operable to facilitate extension and retraction of the extendable arm.

20. The walk-about exoskeleton system of claim 1, further comprising first and second forks extending from the first and second lateral members, respectively, the first and second forks being actuatable to carry a load.

21. The walk-about exoskeleton system of claim 20, wherein the first and second forks are operable to move from a stowed position to a deployed position.

22. The walk-about exoskeleton system of claim 21, wherein the first and second forks are retractable into the first and second lateral members.

23. The walk-about exoskeleton system of claim 21, wherein the first and second forks are rotatable relative to the first and second lateral members to move from the stowed position to the deployed position.

24. The walk-about exoskeleton system of claim 1, wherein the conveyance system is operably integrated with a remote navigation system via an interface that connects the walk-about exoskeleton to the remote navigation system, the remote navigation system configured to facilitate movement of the walk-about platform about the ground surface in at least one of a riding mode, a remote mode, or an autonomous mode.

25. A walk-about platform operable to support a wearable exoskeleton, the walk about platform comprising:

a mast, a torso member supported by the mast, and an operator interface supported by the torso member;

a robotic exoskeleton interface supported by the torso member, the robotic exoskeleton interface being operable to receive and support an upper-body robotic exoskeleton comprising at least one upper-body robotic limb that interacts with an arm of an operator and that facilitates augmented upper-body movements of the operator, the at least one upper-body robotic limb comprising at least one powered joint actuatable in at least one degree of freedom;

a conveyance system comprising a ground-contacting element, the conveyance system being operable to facilitate actuated movement of the walk-about platform about a ground surface;

a bi-pedal locomotion zone defined, at least in part, by the walk-about platform that provides clearance for bi-pedal locomotion of an operator, the lower-body of the operator being decoupled from the walk-about platform.

26. The walk-about platform of claim 25, wherein the conveyance system is operably integrated with a remote navigation system via an interface that connects the walk-about exoskeleton to the remote navigation system, the remote navigation system configured to facilitate movement of the walk-about platform about the ground surface in at least one of a riding mode, a remote mode, or an autonomous mode.

27. A walk-about exoskeleton system, comprising an upper-body robotic exoskeleton comprising one or more upper-body robotic limbs that each interact with a respective arm of an operator and that each facilitate augmented upper-body movements of the operator, each robotic limb comprising one or more powered joints actuatable in at least one degree of freedom;

a walk-about platform in support of the exoskeleton, the walk-about platform being maneuverable about a ground surface, and comprising:

a conveyance system comprising a ground-contacting element, the conveyance system being operable with the walk-about platform, the conveyance system being operably integrated with a remote navigation system via an interface that connects the walk-about exoskeleton to the remote navigation system, the remote navigation system configured to facilitate movement of the walk-about platform about the ground surface in an autonomous mode; and a bi-pedal locomotion zone defined, at least in part, by the walk-about platform that provides clearance for bi-pedal locomotion of an operator donning the exoskeleton about a ground surface.

28. The walk-about exoskeleton system of claim 27, wherein the conveyance system is further configured to facilitate movement of the walk-about platform about the ground surface in at least one of a riding mode or a remote mode.

29. A ground maneuvering robotic system, comprising:

an upper-body robotic device comprising at least one upper-body robotic limb that interacts with an arm of an operator and that facilitates augmented upper-body movements of the operator, the at least one upper-body robotic limb comprising one or more powered joints that are each actuatable in at least one degree of freedom;

a robotic platform in support of the robotic device, the robotic platform being maneuverable about a ground surface, and comprising:

a conveyance system comprising a ground-contacting element, the conveyance system being operable with the robotic platform, and to facilitate movement of the robotic platform about the ground surface;

a base comprising first and second lateral members and a support bridge supported in an elevated position above the first and second lateral members to define an opening between the support bridge and the ground surface; and a bi-pedal locomotion zone defined, at least in part, by the robotic platform that is configured to provide clearance for bi-pedal locomotion of an operator;

a mast extending up from the base;

a mast interface member moveably coupled to the mast; and a torso member supported by the mast interface member, and in support of the robotic device, the torso member being operable to rotate relative to the mast interface member about an axis of rotation at a torso-forebend joint.

30. A walk-about exoskeleton system, comprising:

an exoskeleton;

a walk-about platform in support of the exoskeleton, the walk-about platform being maneuverable about a ground surface, and comprising:

a conveyance system comprising a plurality of ground-contacting elements in the form of ground-contacting rollers, the conveyance system being operable with the walk-about platform, and to facilitate movement of the walk-about platform about the ground surface;

a walk-about base comprising first and second lateral members and a support bridge supported in an elevated position above the first and second lateral members to define an opening between the support bridge and the ground surface, the first and second lateral members each comprise a retractable extension operable to selectively extend and retract from the first and second lateral members, respectively; and a bi-pedal locomotion zone defined, at least in part, by the walk-about base that provides clearance for bi-pedal locomotion of an operator donning the exoskeleton, the bi-pedal locomotion zone comprising an area defined, at least in part, by the plurality of ground-contacting rollers of the conveyance system, and wherein a center of gravity of the walk-about exoskeleton system is maintained within the area to avoid tipping during use;

a mast extending up from the walk-about base;

a mast interface member moveably coupled to the mast; and a torso member supported by the mast interface member, and in support of the exoskeleton; and an operator interface supported by the torso member, the torso member and the operator interface being operable to rotate relative to the mast interface member about an axis of rotation at a torso-forebend joint, wherein the bi-pedal locomotion zone extends through the opening, such that the clearance provided for the operator extends at least below the support bridge.

* * * * *